(12) United States Patent
Kondo et al.

(10) Patent No.: US 6,519,365 B2
(45) Date of Patent: *Feb. 11, 2003

(54) ENCODER, DECODER, RECORDING MEDIUM, ENCODING METHOD, AND DECODING METHOD

(75) Inventors: Tetsujiro Kondo, Kanagawa (JP); Kunio Kawaguchi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,566

(22) Filed: Sep. 30, 1997

(65) Prior Publication Data

US 2002/0012473 A1 Jan. 31, 2002

(30) Foreign Application Priority Data

Oct. 1, 1996 (JP) ............................................. 8-260668
Feb. 21, 1997 (JP) ............................................. 9-037789

(51) Int. Cl.$^7$ .............................. G06K 9/36; G06K 9/46
(52) U.S. Cl. ........................................ 382/238; 382/246
(58) Field of Search ................................. 382/232, 233, 382/234, 235, 236, 238, 239, 240, 241, 242, 243, 244, 245, 246, 248, 250, 251, 252, 253; 358/261.1, 427, 261.2, 426, 470, 447, 404, 451, 455; 341/65, 67, 95, 106; 375/240.11, 240; 348/398, 400, 416, 417, 422, 390, 384, 386, 391, 393

(56) References Cited

U.S. PATENT DOCUMENTS

| | | | | |
|---|---|---|---|---|
| 5,589,829 A | * | 12/1996 | Astle ........................... | 341/106 |
| 5,675,382 A | * | 10/1997 | Bauchspies .................. | 358/1.9 |
| 5,680,129 A | * | 10/1997 | Weinberger et al. .......... | 341/65 |
| 5,742,892 A | * | 4/1998 | Chaddha ................ | 375/240.11 |
| 5,764,374 A | * | 6/1998 | Seroussi et al. ............. | 382/238 |
| 5,867,602 A | * | 2/1999 | Zandi et al. ................. | 382/248 |

* cited by examiner

*Primary Examiner*—Andrew W. Johns
*Assistant Examiner*—Duy M. Dang
(74) *Attorney, Agent, or Firm*—Frommer Lawrence & Haug LLP; William S. Frommer; Dennis M. Smid

(57) ABSTRACT

To compress images using transition information of adjacent pixels, index transition patterns of two adjacent pixels in the horizontal scanning direction of an image are computed and arranged in order of appearance frequency, then patterns within the upper four appearance frequencies are selected to create a reference table. Then, with reference to the created reference table, image data are encoded. When decoding the encoded data, at first data from both the reference table and the color look-up table is inputted and stored in the table 50 and the color look-up table 53. After this, the first data of the subsequent input data is supplied to both the color look-up table 53 and the delay circuit 51 by changing over the connection of the switch 52. Subsequent data is supplied to the table 50. The table 50 decodes the data to original image data with reference to the data and the output from the delay circuit 51. The color look-up table 53 then converts the decoded data to R, G, and B signals and output the signals.

16 Claims, 17 Drawing Sheets

| INDEX | R | G | B |
|---|---|---|---|
| 0 | 30 | 92 | 240 |
| 1 | 55 | 189 | 92 |
| 2 | 211 | 5 | 64 |
| ⋮ | | | |
| 15 | 21 | 56 | 23 |

FIG. 7

APPEARANCE FREQUENCY ORDER

| Previous Pixel Index Value | 1 | 2 | 3 | 4 | 5 | 6 | 7 | 8 | 9 | 10 | 11 | 12 | 13 | 14 | 15 | ENTROPY |
|---|---|---|---|---|---|---|---|---|---|---|---|---|---|---|---|---|
| 0 | 1 | 13 | 2 | 5 | 4 | 3 | 12 | 6 | - | - | - | - | - | - | - | 1.39 |
| 1 | 8 | 2 | 13 | 3 | 4 | 0 | 5 | 6 | 12 | 11 | - | - | - | - | - | 1.55 |
| 2 | 3 | 1 | 0 | 4 | 5 | 6 | 13 | 9 | 7 | - | - | - | - | - | - | 2.14 |
| 3 | 2 | 1 | 4 | 8 | 9 | 0 | 5 | 12 | 11 | 6 | 13 | 14 | - | - | - | 2.29 |
| 4 | 8 | 5 | 3 | 2 | 6 | 9 | 11 | 1 | 12 | 0 | 7 | 14 | 10 | - | - | 3.13 |
| 5 | 5 | 8 | 11 | 4 | 7 | 10 | 14 | 2 | 9 | 3 | 12 | - | 1 | 13 | - | 3.08 |
| 6 | 7 | 0 | 5 | 11 | 14 | 8 | 15 | 4 | 9 | 2 | 3 | - | - | - | - | 1.62 |
| 7 | 6 | 15 | 10 | 5 | 14 | 11 | 8 | 4 | 9 | - | 15 | - | - | - | - | 0.77 |
| 8 | 14 | 9 | 11 | 5 | 4 | 6 | 10 | 12 | 3 | 7 | - | - | - | - | - | 2.38 |
| 9 | 8 | 12 | 4 | 11 | 5 | 3 | 8 | 6 | 14 | 7 | 15 | - | - | - | - | 1.77 |
| 10 | 14 | 6 | 7 | 11 | 15 | 5 | 9 | 9 | 4 | - | - | - | - | - | - | 1.76 |
| 11 | 14 | 8 | 10 | 6 | 5 | 7 | 8 | 4 | 3 | 12 | - | - | - | - | - | 2.50 |
| 12 | 9 | 8 | 13 | 4 | 5 | 3 | 9 | 1 | 0 | 10 | - | - | - | - | - | 1.39 |
| 0 | 13 | 8 | 12 | 2 | 4 | 5 | - | - | - | 11 | - | - | - | - | - | 1.34 |
| 14 | 0 | 11 | 8 | 6 | 7 | - | 4 | 9 | 15 | - | - | - | - | - | - | 1.93 |
| 7 | 10 | 6 | 11 | 5 | 14 | - | - | - | - | - | - | - | - | - | - | 0.73 |

MEAN ENTROPY (WEIGHTED MEAN): 1.32

FIG. 8

| Previous Pixel Index Value \ Appearance Frequency Order | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 65 | 17 | 0 | 0 | 0 | 0 | 0 | 0 | 0 | 0 | 0 | 0 | 0 | 0 | 0 |
| 1 | 54 | 16 | 1 | 0 | 1 | 0 | 0 | 0 | 0 | 0 | 0 | 0 | 0 | 0 | 0 |
| 2 | 52 | 36 | 3 | 2 | 4 | 2 | 0 | 0 | 0 | 0 | 0 | 0 | 0 | 0 | 0 |
| 3 | 49 | 15 | 8 | 6 | 2 | 2 | 1 | 1 | 1 | 1 | 1 | 1 | 1 | 0 | 0 |
| 4 | 30 | 21 | 8 | 3 | 7 | 4 | 3 | 2 | 2 | 1 | 1 | 1 | 1 | 1 | 0 |
| 5 | 24 | 16 | 9 | 7 | 7 | 6 | 3 | 2 | 2 | 1 | 1 | 0 | 0 | 0 | 0 |
| 6 | 55 | 23 | 10 | 9 | 1 | 1 | 1 | 0 | 0 | 0 | 0 | 0 | 0 | 0 | 0 |
| 7 | 86 | 35 | 3 | 0 | 0 | 0 | 0 | 0 | 0 | 0 | 0 | 0 | 0 | 0 | 0 |
| 8 | 49 | 10 | 1 | 5 | 3 | 3 | 2 | 1 | 1 | 0 | 0 | 0 | 0 | 0 | 0 |
| 9 | 58 | 13 | 11 | 1 | 1 | 1 | 1 | 0 | 0 | 0 | 0 | 0 | 0 | 0 | 0 |
| 10 | 65 | 21 | 2 | 4 | 2 | 1 | 1 | 0 | 0 | 0 | 0 | 0 | 0 | 0 | 0 |
| 11 | 38 | 15 | 6 | 7 | 5 | 2 | 1 | 1 | 0 | 0 | 0 | 0 | 0 | 0 | 0 |
| 12 | 66 | 19 | 11 | 1 | 1 | 0 | 0 | 0 | 0 | 0 | 0 | 0 | 0 | 0 | 0 |
| 13 | 55 | 26 | 2 | 0 | 0 | 0 | 0 | 0 | 0 | 0 | 0 | 0 | 0 | 0 | 0 |
| 14 | 53 | 38 | 1 | 3 | 1 | 1 | 0 | 0 | 0 | 0 | 0 | 0 | 0 | 0 | 0 |
| 15 | 87 | 22 | 10 | 0 | 0 | 0 | 0 | 0 | 0 | 0 | 0 | 0 | 0 | 0 | 0 |
| | | 8 | 0 | | | | | | | | | | | | |

FIG. 9

|   | 0 | 1 | 2 | 3 |
|---|---|---|---|---|
| 0 | 0 | 1 | 13 | 2 |
| 1 | 1 | 8 | 2 | 13 |
| 2 | 2 | 3 | 1 | 0 |
| 3 | 3 | 2 | 1 | 4 |
| 4 | 4 | 8 | 5 | 3 |
| 5 | 6 | 5 | 8 | 11 |
| 6 | 6 | 7 | 10 | 5 |
| 7 | 7 | 6 | 15 | 10 |
| 8 | 8 | 14 | 9 | 11 |
| 9 | 9 | 8 | 12 | 4 |
| 10 | 10 | 14 | 6 | 7 |
| 11 | 11 | 14 | 8 | 10 |
| 12 | 12 | 9 | 8 | 13 |
| 13 | 0 | 13 | 1 | 12 |
| 14 | 14 | 10 | 11 | 8 |
| 15 | 7 | 10 | 6 | 11 |

FIG. 16

| TWO PIXELS BEFORE | ONE PIXEL BEFORE | 0 | 1 | 2 | 3 |
|---|---|---|---|---|---|
| 0 | 0 | 1 | 3 | 15 | 4 |
| 0 | 1 | 8 | 2 | 1 | 6 |
| 0 | 2 | 9 | 7 | 12 | 11 |
| 0 | 3 | 10 | 2 | 5 | 4 |
| ⋮ | ⋮ | ⋮ | ⋮ | ⋮ | ⋮ |
| 15 | 15 | 3 | 6 | 9 | 13 |

| 0 | 0 | 0 | 0 | 0 | 0 |
|---|---|---|---|---|---|
| 0 | 0 | 2 | 2 | 0 | 0 |
| 0 | 11 | 2 | 2 | 11 | |
| 0 | 0 | 11 | 11 | 11 | |
| 0 | 11 | 9 | 5 | 5 | |
| 0 | 0 | 0 | 0 | 0 | |

ENCODER, DECODER, RECORDING MEDIUM, ENCODING METHOD, AND DECODING METHOD

BACKGROUND OF THE INVENTION

The present invention relates to an encoder, a decoder, a recording medium, a coding method, and a decoding method, more particularly to an encoder, a decoder, recording medium, a coding method, and a decoding method for encoding or decoding images with reference to a reference table.

An image processing apparatus that uses a color look-up table has an advantage to reduce the amount of image information easily by reducing the number of bits assigned to each pixel.

When the number of bits assigned to each pixel is reduced, however, the number of colors that can be displayed is also reduced. This is a problem to arise from such a prior art image processing apparatus.

Under such the circumstances, it is an object of the present invention to solve the problem and enable the information amount of an entire image to be reduced without reducing the number of colors that can be displayed.

SUMMARY OF THE INVENTION

An encoder according to the present invention comprises a unit for computing transition information concerning transition of indexes of at least two of adjacent pixels of those forming an image; a unit for creating a reference table by selecting part of the transition information computed by the transition information computing unit by a specified method; and a unit for encoding the image with reference to the reference table created by the unit for creating the reference table.

A method of encoding an image according to the present invention comprises the steps of computing transition information concerning transition of indexes of at least two of adjacent pixels of those forming an image; creating a reference table by selecting part of the transition information computed in the step of computing transition information by a specified method; and encoding the image with reference to the reference table created in the step of creating reference table.

A recording medium according to the present invention is recorded with a reference table created by computing transition information concerning transition of indexes of at least two of adjacent pixels of those forming an image and selecting part of the computed transition information by a specified method, and image information encoded with reference to the created reference table.

A decoder according to the present invention comprises a unit for storing a reference table created by computing transition information concerning transition of indexes of at least two of adjacent pixels of those forming an image and selecting part of the computed transition information by a specified method; a unit for inputting image data compressed with reference to the reference table; and a unit for decoding the image data inputted by the unit for inputting with reference to the reference table stored in the reference table saving unit.

A method of decoding according to the present invention comprises the steps of storing a reference table created by computing transition information concerning transition of indexes of at least two of adjacent pixels of those forming an image and selecting part of the computed transition information by a specified method; inputting the image data compressed with reference to the reference table; and decoding the image data inputted in the step of inputting with reference to the reference table stored in the step of storing reference table.

In an encoder according to the present invention, the transition information computing unit computes transition information concerning transition of indexes of at least two of adjacent pixels of those forming an image, the reference table creating unit creates a reference table by selecting part of transition information computed by the transition information computing unit by a specified method, and the encoder encodes images with reference to the reference table created by the reference table creating unit. For example, the transition information computing unit computes transition information concerning transition of indexes of two adjacent pixels in the horizontal scanning direction on the screen and the reference table creating unit creates a reference table by selecting the information of the upper four appearance frequencies from the transition information computed by the transition information computing unit, and the encoder encodes pixel data forming an image sequentially with reference to the created reference table.

In an encoding method according to the present invention, transition information concerning transition of indexes of at least two of adjacent pixels of those forming an image is computed in the step of computing transition information, a reference table is created in the step of creating the reference table by selecting part of the transition information computed in the step of computing transition information by a specified method, and images are encoded in the step of encoding with reference to the reference table created in the step of creating the reference table. For example, transition information concerning transition of indexes of two adjacent pixels in the horizontal scanning direction on the screen are computed in the step of computing transition information the reference table is created in the step of creating the reference table by selecting information of the upper four appearance frequencies from the transition information computed in the step of computing transition information, and pixel data forming an image are sequentially encoded in the step of encoding with reference to the created reference table.

In a recording medium according to the present invention, there is recorded a reference table created by computing transition information concerning transition of indexes of at least two of adjacent pixels of those forming an image and selecting part of the computed transition information by a specified method, and image information encoded with reference to the created reference table. For example, the recording medium is recorded with a reference table created by computing transition information concerning transition of indexes of two adjacent pixels in the horizontal scanning direction on the screen and selecting information of the upper four appearance frequencies from the computed transition information, and pixel data encoded with reference to the created reference table.

In a decoder according to the present invention, the reference table storing unit stores a reference table created by computing transition information of indexes of at least two of adjacent pixels of those forming an image and selecting part of the computed transition information by a specified method, the input unit inputs image data encoded with reference to the reference table, and the decoder decodes image data inputted by the input unit with reference to the reference table stored in the reference table saving unit. For example, the reference table storing unit stores a reference table created by computing transition information concerning transition of indexes of two adjacent pixels in the horizontal scanning direction on the screen and selecting the information of the upper four appearance frequencies from the computed transition information, and the decoder decodes encoded image data inputted by the input unit to original data with reference to the reference table stored in the reference table storing unit.

In a decoding method according to the present invention, a reference table is stored in the step of storing a reference table, the reference table being created by computing transition information concerning transition of indexes of at least two of adjacent pixels of those forming an image and selecting part of the computed transition information by a specified method, image data encoded with reference to the reference table is inputted in the step of inputting, and the image data inputted in the step of inputting are decoded with reference to the reference table stored in the step of storing reference table. For example, in the step of storing a reference table, there is stored a reference table created by computing transition information concerning transition of indexes of two adjacent pixels in the horizontal scanning direction on the screen and selecting the information of the upper four appearance frequencies from the computed transition information, and in the step of decoding, encoded image data inputted in the step of inputting are decoded to original data with reference to the reference table stored in the step of storing the reference table.

BRIEF DESCRIPTION OF THE DRAWINGS

FIG. 7 is an example of a transition table showing transition of pixels in an image;

FIG. 8 shows the appearance frequency of each element of the transition table shown in FIG. 7;

FIG. 9 shows an example of a reference table created by selecting the information of the upper 4 appearance frequencies from the transition table shown in FIG. 7;

FIG. 16 is an example of a reference table stored in the table 50 shown in FIG. 15;

DESCRIPTION OF THE PREFERRED EMBODIMENTS

Figure 1:
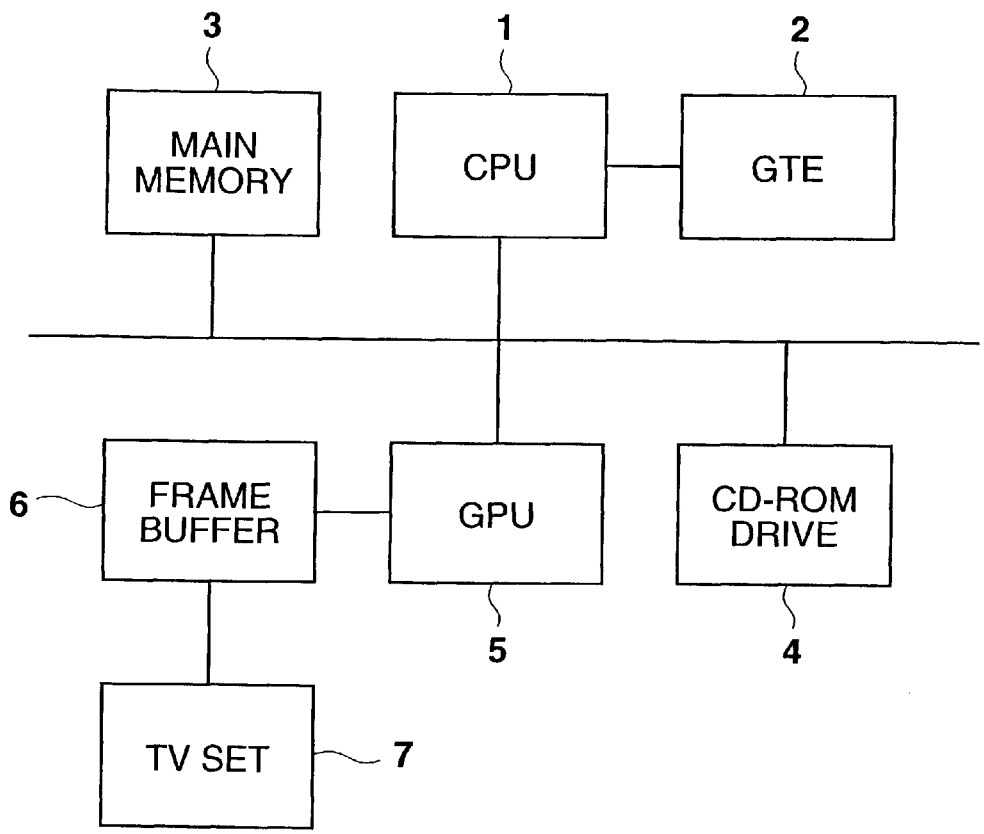
FIG. 1 is a block diagram showing a configuration of the encoding apparatus of the present invention in an embodiment.

FIG. 1 is an illustration of a home TV game playing apparatus in an embodiment of the present invention.

As shown in FIG. 1, a home TV game playing apparatus comprises a CPU (Central Processing Unit) 1 for controlling the whole apparatus (a transition information computing unit, a reference table creating unit, an encoder, and a variable length encoder), a GTE (Graphic Transfer Engine) 2 for geometrical operations such as coordinate conversion), a main memory 3 for storing data temporarily, a CD-ROM drive 4 for reading data from a CD-ROM that records image data and programs, a GPU (Graphic Processing Unit) 5 for processing images, a frame buffer 6 for storing image data processed in the GPU 5, and a television set 7 for displaying video signals output from the frame buffer 6.

Hereunder, this embodiment will be explained more in detail.

Turning on the power supply of a home TV game playing apparatus enables the CPU 1 to read the start-up program from a ROM (Read Only Memory) built in the main memory 3. Then, the CPU 1 executes the start-up program to operate the operating system.

The CPU 1 reads an application program from the CD-ROM drive 4 and stores the application program in the RAM (Random Access Memory) built in the main memory 3. Then, the CPU 1 reads the stored application program by one processing unit at a time.

Executing a processing for displaying image data in an application program, the CPU 1 reads the 3-dimentional object data (a coordinate value of a polygon peak (representative point), etc.) comprising a plurality of basic patterns (a polygon) from the CD-ROM drive 4.

The GTE 2 executes a geometric operation such as coordinate conversion for the coordinates of each polygon peak supplied from the CPU 1 and supplies the processing result to the GPU 5.

The GPU 5 inputs data such as a coordinate value (a 3-dimentional coordinate value) of a polygon output from the GTE 2 and converts the 3-dimentional coordinate value to a 2-dimentional coordinate value corresponding to the specified display portion to generate pixel data corresponding to the polygon from the data and writes the pixel data into a frame buffer 6, and finally executes a rendering processing.

Data of images (e.g., background images) to appear in the object game other than characters are compressed (to be described later) and stored in a CD-ROM (not illustrated). The GPU 5 reads compressed image data from the CD-ROM drive 4 to expand the data, then outputs the expanded data to the frame buffer 6. The frame buffer 6 executes a superposing processing for the pixel data generated from the polygon and the pixel data of expanded image data.

The pixel data written in the frame buffer 6 is converted to video signals conforming to the NTSC system and output to the television set 7. The television set 7 displays the entered video signals as images.

Figure 2:
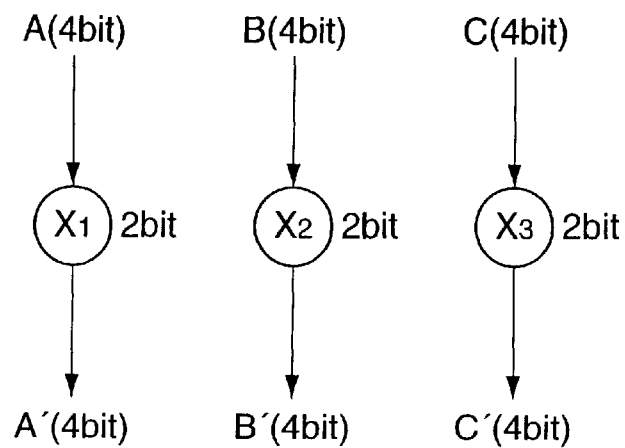
FIG. 2 is an illustration of the encoder and the decoder of the present invention explaining the operation of each of the devices in an embodiment.

FIG. 2 is an example of an encoding processing (to be described later) of an image executed by the CPU 40 shown in FIG. 3 and the outline of a decoding processing executed by the GPU 5 shown in FIG. 1.

As described above, the image data stored in the CD-ROM is divided into 2 kinds of data; polygon peak coordinate data and compressed pixel data. Compressed pixel data is compressed and expanded in the following processes.

That is, 4-bit pixel data A to C is encoded to 2-bit pixel data X1 to X3. Then, the data is decoded to 4-bit pixel data A' to C'. When data is encoded, some of the data is discarded. Thus, the pixel data A to C is not always identical to pixel data A' to C'.

In this embodiment, therefore, at first encoding that can assure A=A' is searched. If such encoding is judged impossible (A≠A'), encoding that can assure matching of values before and after encoding of the next pixel data (B=B') is searched. If such encoding is judged impossible (B≠B') even in the next pixel data, encoding that can assure matching of values before and after further the pixel data (C=C') is searched.

Although encoding of three pixel data items is explained in the above embodiment, the present invention may also apply to encoding of four or more pixel data items, of course.

Subsequently, an example of an encoder configuration will be described.

Figure 3:
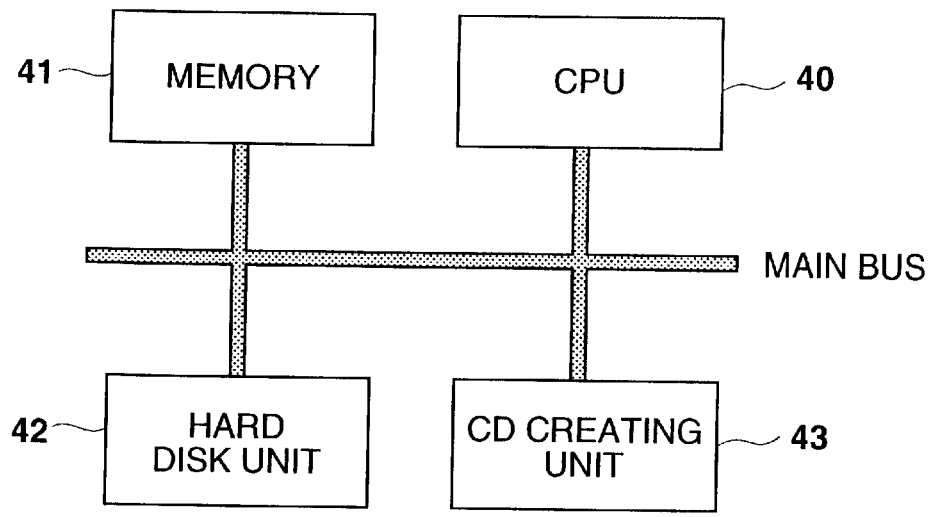
FIG. 3 is a block diagram showing a configuration of the encoder of the present invention in an embodiment.

FIG. 3 is a block diagram showing a configuration of the encoder of the present invention. In FIG. 3, the CPU 40 executes various arithmetic operations, as well as controls each part of this encoder. The memory 41 comprising a RAM and a ROM stores programs to be executed by the CPU 40 and transition data temporarily during an operation. The hard disk 42 stores pixel data to be encoded. The CD creating unit 43 records encoded data supplied from the CPU 40 on an original CD. A CD can be created by stampering a data-recorded original CD used as a master CD.

Subsequently, the operation of this embodiment will be explained with reference to the flow chart shown in FIG. 4. The CPU 40 executes this processing by reading the data stored in the memory 41 or the hard disk 42 shown in FIG. 3 by one processing unit at a time.

In this processing, the CPU 40 reads pixel data to be encoded from the hard disk unit 42 in step S1 by one processing unit at a time.

Figures 5, 6:
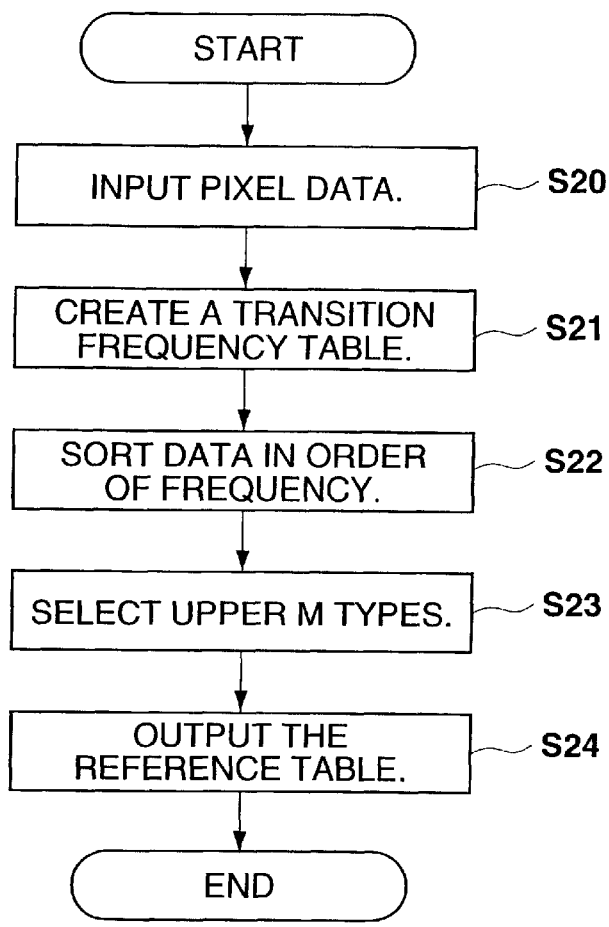
FIG. 5 is a flow chart explaining the details of the processing in step S2 in FIG. 4.
FIG. 6 is an example of a color look-up table.

Pixel data is divided into a unit pixel comprising a plurality of adjacent picture elements and a reference value (index) is given to each pixel data corresponding to its display color. In other words, as shown in FIG. 6, a pixel given "0" as its index comprises three types of signals of R=30, G=92, and B=240. In the same way, a pixel given "1" as its index comprises signals of R=55, G=189, and B=92.

Return to FIG. 4. When a pixel data entry is ended, the progress goes to step S2 in which the CPU 40 creates a reference table (to be described later) from read pixel data and stores the table in the memory 41 and outputs the table to the CD creating unit 43 so that the table is recorded on a CD.

After this, the progress goes to step S3 and the CPU 40 encodes pixel data according to the reference table created in step S2. In step 4, the CPU 40 outputs the encoded data to the CD creating unit 43 so that the data is recorded on a CD.

Figure 4:
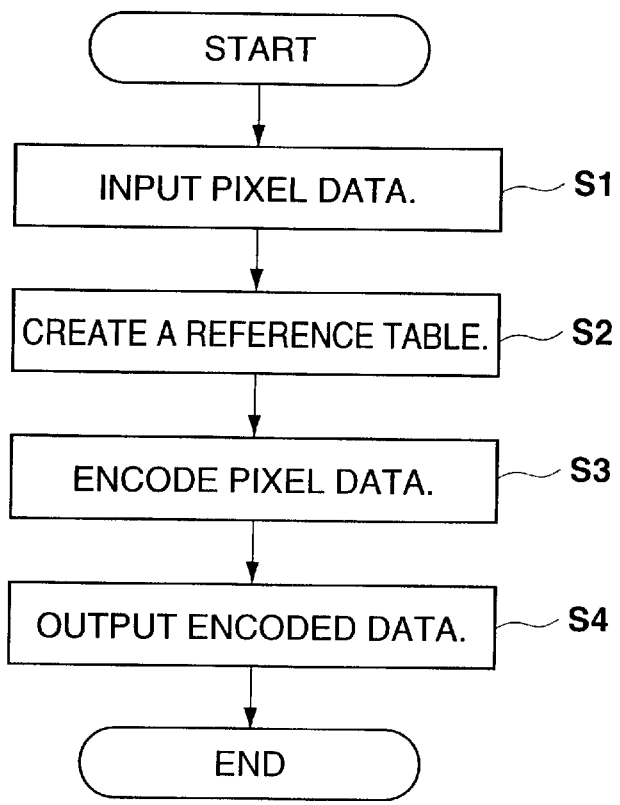
FIG. 4 is a flow chart explaining a processing executed in the embodiment shown in FIG. 3.

FIG. 5 shows a flow chart explaining the details of the processing in step S2 in FIG. 4. In this processing, the CPU 40 reads pixel data (of one processing unit) (e.g., pixel data for one screen) from a specified area.

In step S21, the transition frequency of the indexes of two adjacent pixels in the horizontal scanning direction is measured to create a transition frequency table. Then, the progress goes to step S22 and the CPU 40 sorts pixel data in order of frequency.

FIG. 7 is an example of the transition frequency table created in the processing in step S22. The vertical direction in this table indicates the index value of each previous pixel and the horizontal direction indicates the order of index transition frequencies. Each pixel takes a value within 0 to 15.

In FIG. 7, when the index of the previous pixel is "0", for example, "0" becomes the index of the next pixel having the highest probability of appearance and "1", "13", and "2" are the indexes of the pixels having the next highest probability of appearance.

FIG. 8 shows the appearing frequency (%) of each pixel shown in FIG. 7. For example, as described above, when the index of the previous pixel is "0", the appearance frequency of the pixel having an index "0" is 65%. In the case of a pixel having an index "1", its appearance frequency is 17%.

The entropy shown on the right end in FIG. 8 indicates the number of bits necessary for an executed ideal Huffman coding. In other words, in such the Huffman coding, a short transmission code is given to an index with high appearance probability and a long code is given to an index with low appearance probability. Consequently, the more the number of bits becomes, the larger the entropy becomes. In addition, the more the number of bits becomes, the higher the appearance probability becomes. Such an entropy can be found from the following expression.

$$H=\Sigma p(x)\log 2\{1/p(x)\} \quad (1)$$

where p(x) is an appearance probability of the code x and the unit of entropy H is bit/sample.

The entropy's arithmetic mean of all the indexes in the example shown in FIG. 7 is 1.32.

Return to FIG. 5. In step S23, the upper M types are selected from the transition frequency table sorted in step S22, so that a reference table is created. FIG. 9 indicates a reference table created when M=4 is set. In other words, the data in the left 4 columns shown in FIG. 7 are selected to create a reference table shown in FIG. 9.

In step S24, the CPU 40 outputs the created reference table to the memory 41, as well as to the CD creating unit 43 so that the table is recorded. The CPU 40 then exits the processing.

After creating the reference table, the CPU 40 executes processings in and after step S3 shown in FIG. 4 to encode the pixel data read in the processing in step S1 and outputs the encoded data to the CD creating unit so that the data is recorded.

Figure 10:
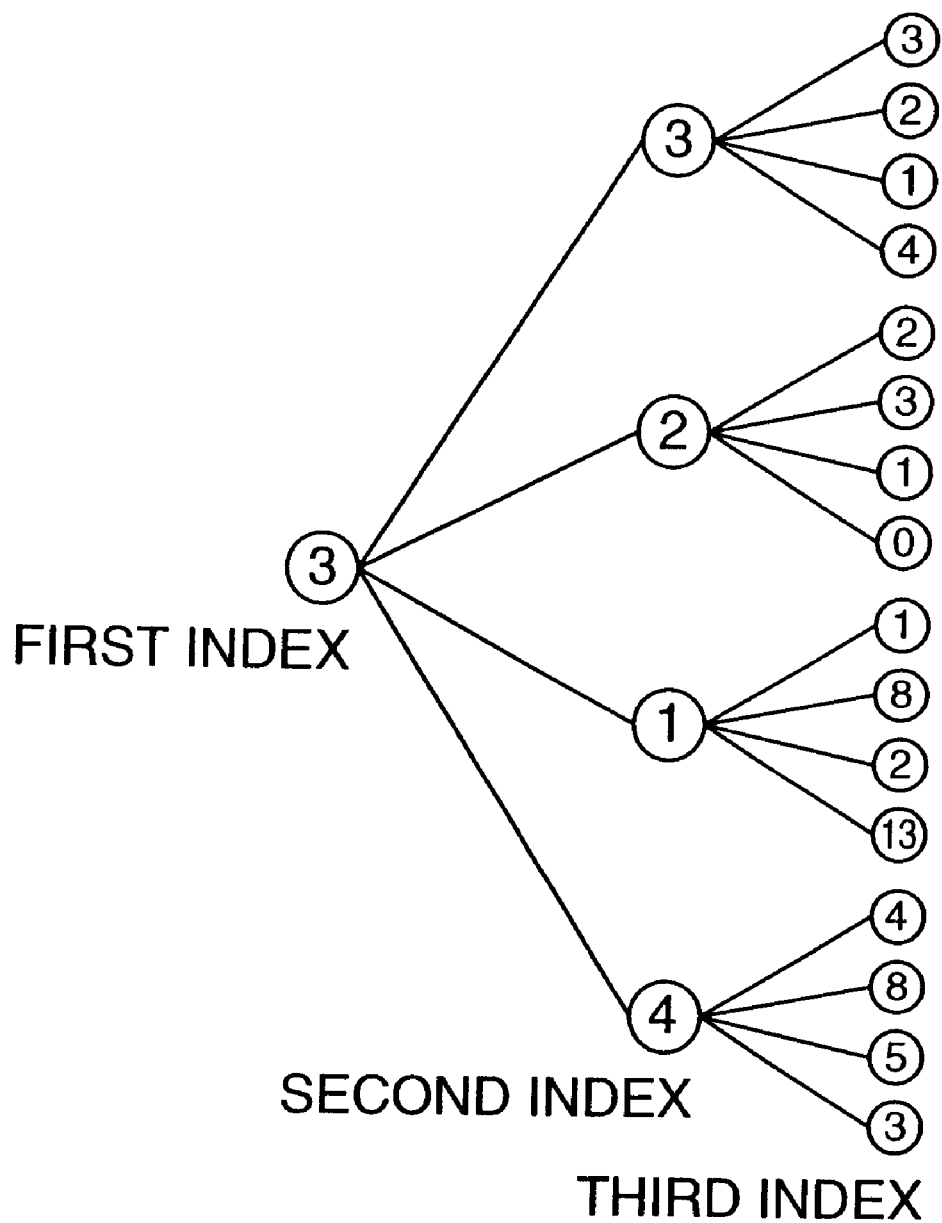
FIG. 10 shows a tree structure created for searching matching indexes from subsequent indexes when no object index is found in the reference table shown in FIG. 9.
Figure 11:
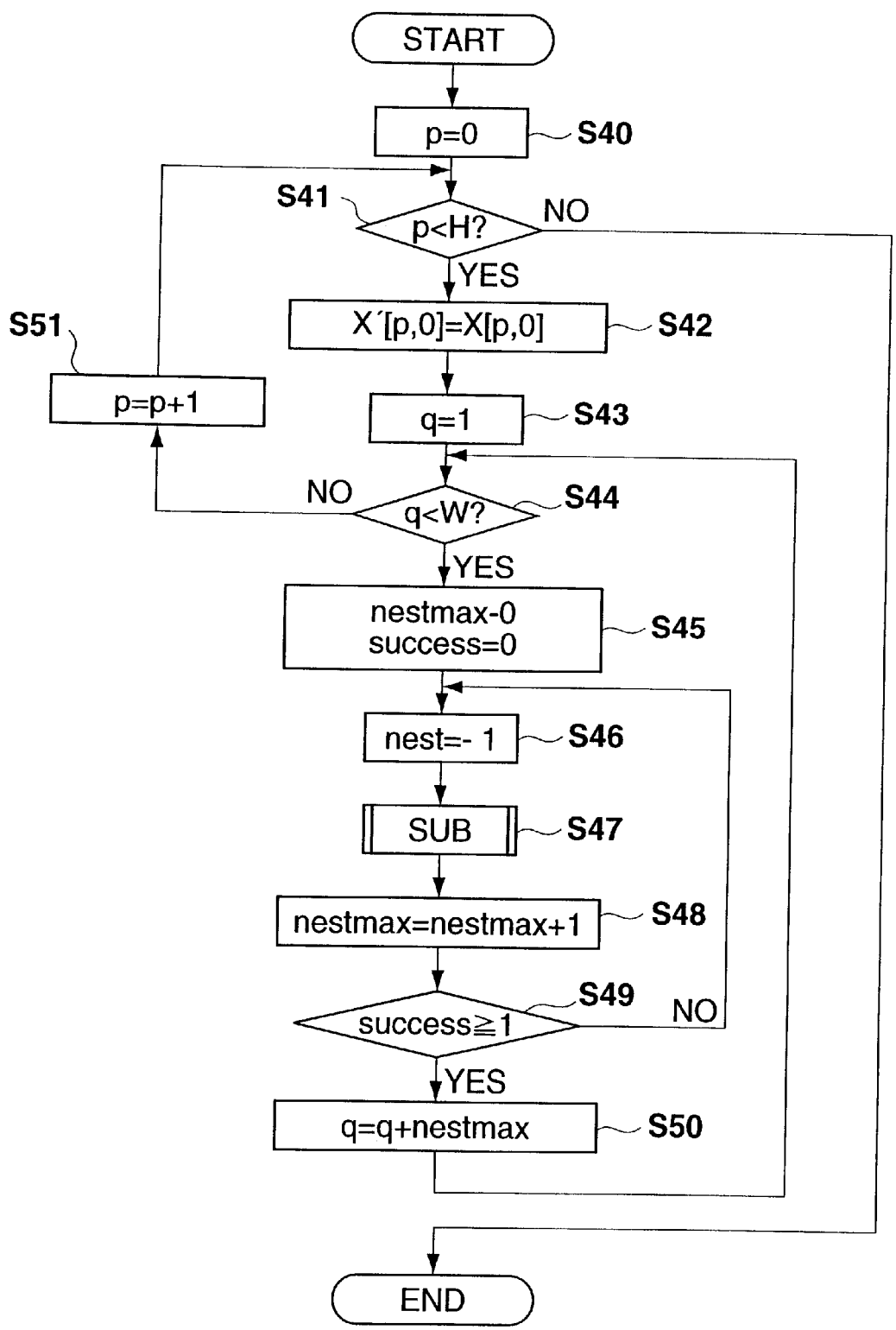
FIG. 11 is a flow chart explaining the details of a pixel data encoding processing in step S3 in FIG. 4.
Figure 12:
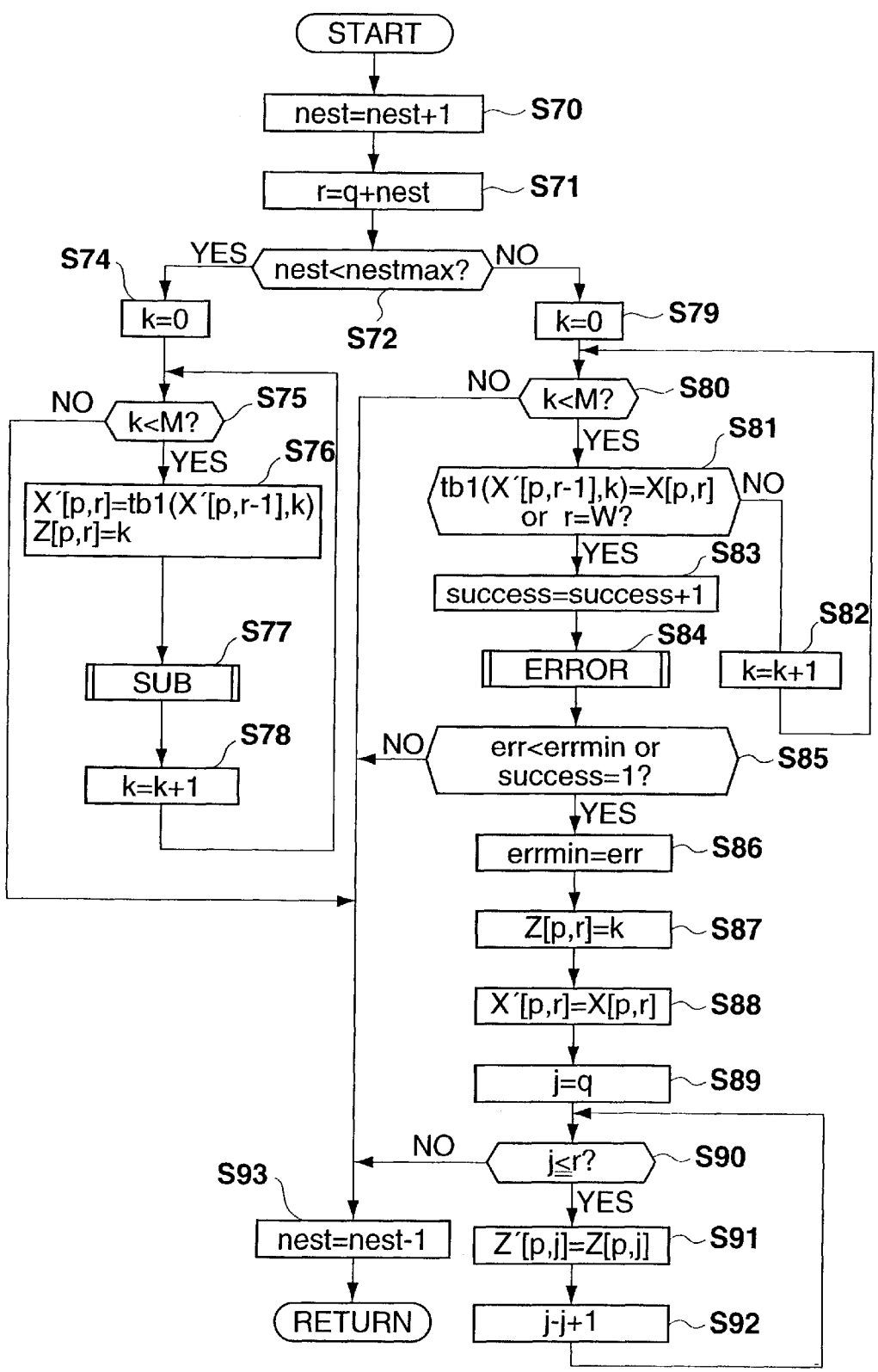
FIG. 12 is a flow chart explaining the details of the subroutine in step S47 in FIG. 11.
Figure 13:
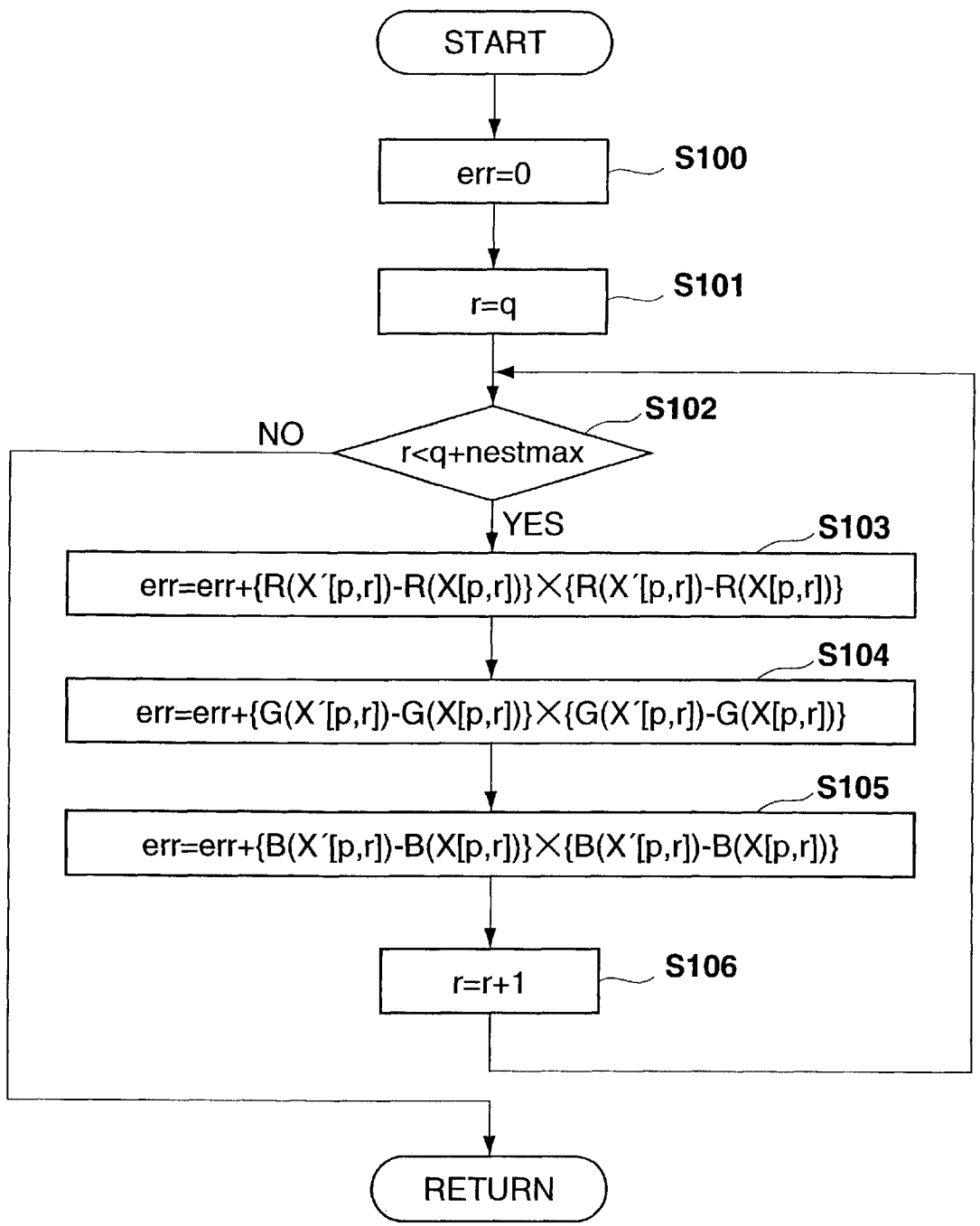
FIG. 13 is a flow chart explaining the details of the subroutine in step S84 in FIG. 12.

FIGS. 11 to 13 are flow charts explaining the details of pixel data encoding in step S3 shown in FIG. 4. This processing is executed after a reference table is created. In this section, those processings will be outlined with reference to FIG. 10 before explaining the details of the processings in those flow charts.

FIG. 10 explains the outline of the operation in the flow charts shown in FIGS. 11 to 13. Assume now that an index value X={6, 5, 8, 9} is entered for a pixel before encoding and the reference table shown in FIG. 9 is used.

As described above, the column direction of the reference table shown in FIG. 9 indicates index values of previous pixels and the row direction indicates the order of appearance frequencies. When such a reference table is represented by a two-dimensional array tbl, each element tbl [p,j] ($0 \leq p \leq 15$, $0 \leq j \leq 3$) indicates that the index of the previous pixel is p and the appearance frequency of the pixel is the j-th. For example, when considering encoding of consecutive indexes of "6" and "5" (the 0-th and 1st elements (4 bits) of the above described X), "6" is given to the previous pixel as its index and "5" is given to the current pixel as its index. Then, this corresponds to tbl[6,3]=5. Consequently, these two indexes are represented as "3" (2 bits) using the order of such a pixel transition order.

In the same way, the first element "5" and the second element "8" of X correspond to tbl [5,2]=8, and accordingly, an encoded value "2" is obtained. The second element "8" and the third element "9" correspond to tbl [8, 2]=9, and accordingly, an encoded value "2" is obtained.

According to the above operation, Z'={3, 2, 2} (2 bits) is obtained as encoded data Z'. When decoding an encoded data item, the 0th data (=6) of X is needed, so this "6" (4 bits) is recorded in the CD creating unit 43 at the same time.

When decoding such encoded data, the first data is decoded from the 0th index "6" of X and the 0th data "3" of Z' assuming tbl [6, 3]=5. In addition, as the second data, tbl [5, 2]=8 is obtained from the decoded 0th data "5" and the first data "2" of Z'. Furthermore, as the third data, tbl [8, 2]=9 is obtained in the same way.

Subsequently, explanation will be made for an operation to be executed when an index not described in the reference table shown in FIG. 9 is included in the data to be encoded. For example, a case of X={2, 3, 5, 8} is explained.

In this case, the 0th index "2" and the first index "3" can be encoded as "1" at tbl [2, 1]=3. However, the first index "3" and the second index "5" do not exist in the reference table shown in FIG. 9 ("5" does not exist in the third row in FIG. 9).

In such a case, matching of the first and second indexes is abandoned, and the value of the second index is changed as needed to enable matching of the changed second index and the third index.

In the case that the first index is "3" as shown in FIG. 10, the indexes that can follow the first index are "3", "2", "1", and "4" existing in the reference table. The third index that can follow those indexes is found to be "3", "2", "1", and "4" existing in the reference table when the second index is "3". When the second index is "2", however, "2", "3", "1", and "0" can follow the above indexes. And so forth as shown in FIG. 10.

On the other hand, the third index of X is "8". In the tree structure shown in FIG. 10, "8" is included in the first index of each of the third indexes when the second indexes are "1" and "4". Consequently, matching is possible for each of the first to third indexes when the second index is replaced with any of those values.

However, the second index is "5" from the beginning. When this value is replaced with "1" or "4", therefore, a difference from the original data is generated. Thus, "1" or "4", whichever the difference is less, is selected to change the value with reference to the reference table. Assume now that when "1" is selected as the second index, the difference becomes less. So, the original pixel data X={2, 3, 5, 8} is changed to X'={2, 3, 1, 8} with reference to the reference table. The result becomes Z'={1, 2, 1}.

Computing of an error may be made by selecting an index having the minimum value found from values obtained by squaring the difference of each of R, G, and B signals corresponding to the indexes after and before replacement in the color look-up table shown in FIG. 6.

Subsequently, the processing shown in FIG. 11 will be explained.

In this processing, the CPU 40 initializes the variable p indicating a coordinate value of an image (screen) in the vertical direction to "0". Then, the progress goes to step S41 and the CPU 40 judges whether or not the p value is smaller than the number of pixels H in the vertical direction. When judged smaller (YES), the progress goes to step S42. When judged greater or equal (NO), the CPU 40 ends the processing (END).

In step S42, the CPU 40 substitutes the (p, 0)-th value of the 2-dimentional array X that stores non-encoded pixel indexes for the (p, 0)-th element of the 2-dimentional array X' that stores encoded pixel indexes. In other words, the index of the 0th pixel in the horizontal direction on the screen is stored as the initial value in the array X without being encoded.

In step S43, the variable q indicating a coordinate value in the horizontal direction on the screen is initialized to "1". Then, the progress goes to step S44 and it is judged whether or not the q value is smaller than the number of pixels W in the horizontal direction. When judged greater or equal (NO), the progress goes to step S51 and the variable p is increased by one. Then, the progress returns to step S41 and the same processing as the above is repeated. When judged smaller (YES), the progress goes to step S45.

In step S45, both the variable nestmax in which the maximum length of searching is to be substituted and the variable success in which a searching result flag is substituted are initialized to "0" respectively. Then, the progress goes to step S46 and the variable nest in which a searching length is stored is initialized to "−1". Then, the progress goes to step S47 and the subroutine (the details will be described later) shown in FIG. 12 is called.

Ending the subroutine processing in step S47, the progress goes to step S48 and the variable nestmax value is increased by one. Then, the progress goes to step S49 and it is judged whether or not the value in the variable success is greater than or equal to "1". When the value in the variable success is judged "0" (NO), the progress returns to step S46 and the processing is repeated. When judged greater than or equal to "1" (YES), the progress goes to step S50.

In step S50, the value in the variable nestman is added to the variable q, then the progress returns to step S44 to repeat the processing.

Subsequently, the flow chart shown in FIG. 12 will be explained.

When the subroutine shown in FIG. 12 is called in step S47, the value of the variable nest is increased by one. Then, the progress goes to step S71 to substitute the current coordinate q of the pixel in the horizontal direction and a value to which a search length nset is added for the variable r. The progress then goes to step S72.

In step S72, it is judged whether or not the nest value is smaller than the nestmax value. When judged smaller (YES), the progress goes to step S47. When judged greater or equal (NO), the progress goes to step S79.

In step S74, the variable k is initialized to "0". Then, the progress goes to step S75 and it is judged whether or not the value of the variable k is smaller than the value of the variable M (data type selected when creating a reference table in FIG. 5). When judged smaller (YES), the progress goes to step S76. When judged greater or equal (NO), the progress goes to step S93.

In step S76, the (X'[p, r−1], k)-th element of the 2-dimentional array tbl that stores the reference table shown in FIG. 9 is substituted for the (p, r)-th element of the array X' that stores an encoded pixel index. Furthermore, the value of the variable k is stored in the (p, r)-th element of the 2-dimentional array Z that stores an encoded value. The progress then goes to step S77.

The subroutine shown in FIG. 12 has a recursive structure, so the processing called in step S77 becomes the processing itself shown in FIG. 12. In other words, execution of the processing in step S77 returns the progress to step S70 to repeat the processing. This part processing will be described later more in detail.

Ending the processing in step S77, the progress goes to step S78 and the value of the variable k is increased by one. Then, the progress returns to step S75, repeating the processing. When the value of the variable k becomes equal to the M value, the progress goes to step S93.

In step S72, it is judged whether or not the value of the variable nest is greater than or equal to the value of the variable nestmax. When judged equal (NO), the progress goes to step S79. In step S79, the variable k is initialized to "0". Then, the progress goes to step S80 and it is judged whether or not the value of the variable k is smaller than the M value. When judged greater or equal (NO), the progress goes to step S93. When judged smaller (YES), the progress goes to step S81.

In step S81, it is judged whether or not the (X'[p, r−1],K)-th element of the 2-dimentional array tbl in which the reference table shown in FIG. 9 is stored is equal to the (p, r)-th element of the 2-dimentional array X in which a non-encoded pixel index is stored (1) or whether or not the value of the variable r is equal to the w value (2). When at least one of (1) and (2) is judged satisfied (YES), the progress goes to step S83. When neither (1) nor (2) is judged satisfied (NO), the progress goes to step S82. In step S82, the value of the variable k is increased by one, then the progress returns to step S80, repeating the processing.

When judged YES in step S81, the progress goes to step S83. In step S83, the value of the variable success is increased by one and the progress goes to step S84. The processing in step S84 is executed by the subroutine. The processing will be explained later.

Ending the processing in step S84, the progress goes to step S85. In step S85, it is judged whether or not the integrated error value stored in the variable errmin is smaller than the minimum value (1) or whether or not the value of the variable success is "1" (2). When at least one of (1) and (2) is judged satisfied (YES), the progress goes to step S86. When neither (1) or (2) is judged satisfied (NO), the progress goes to step S93.

In step S86, the value of the variable err is substituted for the variable errmin. In other words, the minimum value of the error value integrated so far is updated by the value of the variable err.

In step S87, the value of the variable k is stored in the (p, r)-th element of the 2-dimentional array Z. The progress then goes to step S88. In step S88, the (p, r)-th element of the array X is substituted for the (p, r)-th element of the array X'. The progress then goes to step S89 and the value of the variable q is substituted for the variable j.

In step S90, it is judged whether or not the value of the variable j is smaller than or equal to the value of the variable r. When judged greater (NO), the progress goes to step S93. When judged smaller or equal (YES), the progress goes to step S91.

In step S91, the (p, j)-th element of the array Z is substituted for the (p, j)-th element of the array Z'. The progress then goes to step S92 and the value of the variable j is increased by one. The progress returns to step S90 to repeat the processing. When the value of the variable j becomes greater than the value of the variable r, the progress goes to step S93.

In step S93, the value of the variable nest is decreased by one and the progress returns to the initial processing (RETURN). In other words, when called from the processing in step S77, the progress returns to the processing in step S78. When called from the processing in step S47 in FIG. 11, the progress returns to the processing in step S48.

FIG. 13 is a flow chart explaining the details of processing of the subroutine (ERROR) in step S84 in FIG. 12. Execution of this processing initializes the variable err to "0" in step 100. The variable err stores the integrated error value. The progress then goes to step S101 and the value of the variable q is substituted for the variable r. The progress then goes to step S102.

In step S102, it is judged whether or not the value of the variable r is smaller than the value of (q+nestmax) When judged smaller (YES), the progress goes to step S103.

In step S103, the value of {R (X'[p, r])−R (X [p, r])}2 is added to the current value of the variable err. In other words, the squared value of the red signal level difference (error) in the color look-up table, specified by the arrays X and X', is added to the variable err.

In step S104, the value of {G (X'[p, r])−G (X[p, r])}2 is added to the current value of the variable err. In other words, the squared value of the green signal level difference (error) in the color look-up table, specified by the arrays X and X', is added to the variable err.

In step S105, the value of {B (X'[p, r])−B (X[p, r])}2 is added to the current value of the variable err. In other words, the squared value of the blue signal level difference (error) in the color look-up table, specified by the arrays X and X', is added to the variable err.

The progress goes to step S106 and the value of the variable r is increased by one. The progress then returns to step S102 to repeat the processing. When the value of the variable r becomes equal to the value of (q+nestmax), the progress returns to the initial processing.

Subsequently, the operation in the above flow chart will be explained more in detail.

Assume that X[0, i]={2, 3, 5, 8} (i=0, 1, 2, 3) is read as pixel data at (H=1 and W=4). Furthermore, assume that the reference table used for those data items is as shown in FIG. 9. The processing in this case is the same as the above, so that explanation will be made with reference to the tree structure shown in FIG. 10 as needed.

When the processing shown in FIG. 11 is executed under such the circumstances, the variable p indicating coordinates in the vertical direction on the screen is initialized to "0" in step S40. The progress then goes to step S41 to judge whether or not the value of the variable p is smaller than the number of pixels H (=1) in the horizontal direction. The current p value is 0. Hence, it is judged as YES, and the progress goes to step S42.

In step S42, the value of the (p, 0)-th element of the array X is substituted for the (p, 0)-th element of the array X'. In other words, the current p value is 0, so that the index "2" is stored in the (0, 0)-th element of the array X'.

In step S43, "1" is substituted for the variable q indicating coordinates in the horizontal direction on the screen. The progress then goes to step S44.

In step S44, it is judged whether or not the value of the variable q is smaller than the number of pixels W (=4) in the horizontal direction. The current q value is 1. Hence, it is judged as YES, and the progress goes to step S45.

In step S45, both variable nestmax and variable success are initialized to "0". Then, the variable nest is initialized to "−1" in step S46.

The progress then goes to step S47 and the subroutine shown in FIG. 12 is called.

When the subroutine shown in FIG. 12 is called, the value of the variable nest is increased by one. Then, the value of (q+nest) is substituted for the variable r in step S71. Since the current nest value is −1, the nest value becomes 0 (−1+1) due to the processing in step S70. In addition, since the q value is 1, the r value becomes 1 (=1+0) due to the processing in step S71.

In step S72, since both nest and nestmax values are 0 respectively, it is judged NO. Thus, the progress goes to step S79.

In step S79, the variable k is initialized to "0". In step S80, it is judged whether or not the value of the variable k is smaller than the M value (data type selected when the reference table shown in FIG. 5 is created). Since the current k value is 0 and the M value is 4, it is judged YES. Thus, the progress goes to step S81.

In step S81, it is judged whether or not the (X'[p, r−1], k)-th element of the 2-dimentional array tbl in which the reference table shown in FIG. 9 is stored is equal to the (p, r)-th element of the 2-dimentional array X in which a non-encoded pixel index is stored. Since p=0 and r=1 are set now, the (X'[0, 0], 0)-th element of the array tbl is compared with the (0, 1)-th element of the array X.

Since the (0, 0)-th element "2" of the array X is substituted for the (0, 0)-th element of the array X'in step S42 shown in FIG. 11, X'[0, 0]=2 is assumed. Thus, the (2, 0)-th element (2nd column, 0th row in FIG. 9) of the array tbl becomes "2". And, the (0, 1)-th element of the array X is "3". Thus, they are judged not equal. The progress then goes to step S82 and the value of the variable k is increased by one. The progress then returns to step S80.

Since the current k value is 1, it is judged YES in step S80. The progress thus goes to step S81. In step S81, since k=1 is set, the (2, 1)-th element (second column, first row in FIG. 9) of the array tbl becomes "3" and it is judged equal to the (0, 1)-th element "3" of the array X. The progress thus goes to step S83.

In step S83, the value of the variable success is increased by one (to succeed=1), then the progress goes to step S84 to call the subroutine shown in FIG. 13.

In step S100 of the subroutine shown in FIG. 13, the variable err is initialized to "0". And, the q value is substituted for the variable r in step S101. Thus, since the current q value is 1, r=1 is assumed.

After this, it is judged whether or not the value of the variable r is greater than the value of (q+nestmax). Since the current r value is 1 and the q value is 1, and the nestmax value is 0, the judgment result in step S102 is NO. The progress thus returns to step S85.

In step S85, it is judged whether or not the value of the variable err is smaller than the value of the variable errmin or whether or not the value of the variable success is "1". Since the current success value is 1, the judgment result in step S85 is YES. The progress thus goes to the step S86.

In step S86, the value of the variable err (=0) is substituted for the variable errmin. Then, the progress goes to step S87 and the value of the variable k is substituted for the (p, r)-th element of the 2-dimentional array Z. In other words, Z[0,1]=1 is assumed. Then, the progress goes to step S88 and the (p,r)-th element of the array X is substituted for the (p,r)-th element. Since p=0 and r=1 are set now, the (0,1)-th element "3" of the array X is substituted for the (0,1)-th element of the array X.

In the following step S89, the value of the variable q (=1) is substituted for the variable j. The progress then goes to step S90.

In step S90, it is judged whether or not the value of the variable j is smaller than or equal to the value of the variable r. Since j=1 and r=1 are set now, the judgment result is YES. The progress then goes to step S91.

In step S91, the (p,j)-th element of the array Z is substituted for the (p,j)-th element of the array Z'. In other words, since j=1 and p=0 are set now, the (0,1)-the element "1" of the array Z' is substituted for the (0,1)-th element of the array Z'. The progress then goes to step S92 and the value of the variable j is increased by one (to j=2). Then, the progress returns to step S90. In step S90, the judgment result is NO since j=2 and r=1 are set. The progress then goes to step S93.

In step S93, the value of the variable nest is decreased by one and the progress returns to the initial processing (step S48 in FIG. 11).

In step S48, the value of the variable nestmax is increased by one. The progress then goes to step S49. In step S49, it is judged whether or not the value of the variable success is greater than "1". Since success=1 is assumed in the processing in step S83, the judgment result is YES. The progress thus goes to step S50.

In step S50, the value of the variable nestmax is added to the variable q. Thus, the q value becomes 2. The progress then returns to step S44.

In step S44, the judgment result is YES, since q<W(=4) is set. The progress then goes to step S45 and the values of both variables nestmax and success are initialized to "0" again respectively.

In step S46, the variable nest is initialized to "−1" and the progress goes to step S47 to call the subroutine again.

In step S70 in FIG. 12, the value of the nest is increased by one to nest=0. In step S71, the value of (q+nest) is substituted for the variable r. The progress then goes to step S72.

In step S72, since nest=0 and nestmax=0 are set now, the judgment result is NO. The progress then goes to step S79 and the value of the variable k is initialized to "0". Then, the progress goes to step S80.

In step S80, it is judged whether or not the value of the variable k is smaller than the value of the variable. Since k=0 and M=4 are assumed now, the judgment result is YES. The progress then goes to step S81.

In step S81, as described above, it is judged whether or not the (X'[p,r−1],k)-th element of the array tbl in which the reference table shown in FIG. 9 is stored is equal to the (p,r)-th element of the array X in which a non-encoded pixel index is to be stored or the value of the variable r is equal to the number of pixels W in the horizontal direction on the screen. Since p=0, r=2, and k=0 are set now, the (X'[0,1]), 0)-th element of the array tbl is compared with the (0,2)-th element of the array x.

Since "3" is substituted for the (0,1)-th element of the array X' in step S88, the current value of X'[0,1] is 3. Consequently, the value of tbl [3,0] is 3 and the (0,2)-th element of the array X is "5". Thus, the result becomes tbl (X'[p,r−1],k)≠X[p,r]. Furthermore, since r≠W is assumed, the judgment result in step S81 is NO. The progress thus goes to step S82.

Return to FIG. 12. In step S82, the value of the variable k is increased by one. The progress then returns to step S80.

In step S80, since k=1 is set, the judgment result is NO. The progress then goes to step S81. In step S81, the (X'[0,1],1)-th element "2" (element in 3rd column, 1st row in FIG. 9) of the array tbl is compared with the (0,2)-th element "5" of the array X. The judgment result is NO. The progress then goes to step S82.

In the second and third processings (k=2, 3), the element (=1) on the second row in the third column of the array tbl shown in FIG. 9 is compared with the element (=4) on the third row and the (0,2)-th element (=5) of the array X respectively. The results of both judgments are NO. And, in the fourth processing, it is judged NO in step S80. The progress thus goes to step S93. In step S93, the value of the variable nest is decreased by one and the progress returns to step S48 in FIG. 11.

In other words, the first and second pixel transition patterns are judged not to be included in the reference table, so the most suitable path is selected from those in the tree structure (FIG. 10) created by finding the index of a pixel that can follow the first pixel from the reference table ("3", "2", "1", and "4" can follow the first pixel in this case), then finding the index of the next (third) pixel that can follow from the reference table in the same way.

In step S48, the value of the variable nestmax is increased by one to nestmax=1. The progress then goes to step S49. In step S49, the judgment result becomes NO, since success=0 is set. The progress returns to step S46.

In step S46, the value of the variable is initialized to "−1" and the subroutine is called in step S47.

In step S70 in FIG. 12, the value of the variable nest is increased by one to nest=0. In step S71, the value (=2) of (q+nest) is substituted for the variable r.

In step S72, it is judged whether or not the value of the variable nest is smaller than the value of the variable nestmax. Since nest=0 and nestmax=1 are set now, the judgment result becomes YES. The progress thus goes to step S74.

In step S74, the value of the variable k is initialized to "0". The progress then goes to step S75 and it is judged whether or not the value of the variable k is smaller than the value of the variable M (data type selected when the reference table shown in FIG. 5 is created). Since k=0 and M=4 are set now, the judgment result becomes YES. Thus, the progress goes to step S76.

In step S76, the (X'[p,r−1],k)-th element of the array tbl is substituted for the (p,r)-th element of the array X' and the value of the variable k is stored in the (p,r)-th element of the array Z. In other words, since p=0 and r=2 are set now, the value of X'[p,r−1] is 3. In addition, since k=0 is set now, the element "3" of the table [3,0] is substituted for the (0,2)-th element of the array X', as well as the value "0" is substituted for the (0,2)-th element of the array Z. In other words, "3" is selected as the index of the second pixel in the tree structure shown in FIG. 10. Then, the progress goes to step S77.

In step S77, the subroutine is called. As described above, calling the subroutine in step S77 causes the subroutine itself shown in FIG. 12 to be called. Thus, the processing in step S70 is executed.

In step S70, the value of the variable nest is increased by one to nest=1. The progress then goes to step S71. In step S71, the value of (q+nest=3) is substituted for the variable r.

In the following step S72, the judgment result become NO, since the values of both variables nest and nestmax are "1". The progress thus goes to step S79.

In step S79, the value of the variable k is initialized to "0". The progress then goes to step S80. In step S80, the judgment result becomes YES, since M=4 is set. The progress goes to step S81.

In step S81, it is judged whether or not the (X'[p,r−1],k) element of the array tbl is equal the (p,r)-th element of the array X or the value of the variable r is equal to the W value. Since p=0, r=3, and k=0 are set now, the value of X'[p,r−1]=X'[0,2]=3 (value substituted in step S76) and tbl (X'[p,r−1],k)=tbl [3,0]=3 (element in the 0th row in the 3rd column in FIG. 9) are assumed. In addition, since X[p,r]=X[0,3]=8 is assumed, the judgment result in step S81 becomes NO. The progress thus goes to step S82.

In other words, in the case that the index of the second pixel in FIG. 10 is "3" and the index of the third pixel is "3", the index "3" of the third pixel does not match with the non-encoded data "8". Thus, the judgment result becomes NO.

In step S82, the value of the variable k is increased by one to k=1. Then, the progress returns to step S80. In step S80, since M=4 is set, the judgment result becomes YES. The progress thus goes to step S81.

In step S81, just like in the above, the (3,1)-th element "2" of the array tbl (when the second index in FIG. 10 is "3", and the third index is "2") is compared with value of the (0,3)-th element "8" of the array X. The judgment result becomes NO. The progress thus goes to step S82.

The same processing is also executed for the (3,2)-th element "1" and the (3,3)-th element "4" of the array tbl. In any of those cases, however, the judgment result becomes NO (not matching with the (0,3)-th element "8" of the array X) and the judgment result in step S80 for the fifth loop (k=4) becomes NO. The progress thus goes to step S93. Then, the value of the variable nest is increased by one to nest=0. The progress then returns to the initial processing (step S78).

In other words, when the second index is "3", the third index "8" (index of pixel data before encoding) is judged "not be bale to follow" (NO).

In step S78, the value of the variable k is increased by one to k=1. The progress then returns to step S75. In step S75, the judgment result becomes YES, so that the progress goes to step S76. In step S76, the (X'[p,r−1],k)-th element of the array tbl is substituted for the (p,r)-th element of the array X'. In other words, since p=0, r=2, and k=1 are set now, tbl (X'[p,r−1],k)=tbl [3,1]=2 is assumed. This value "2" is then substituted for the (0,2)-th element of the array X'. In addition, "1" is substituted for the (0,2)-th element of the array Z. Then, the progress goes to step S77 to call the subroutine. (Thus, the processing in step S70 is executed).

In other words, the subsequent processings are executed when the second index is "2" (FIG. 10).

In step S70, the value of the variable nest is increased by one to nest=1. And, in step S71, the value of (q+nest) (=3) is substituted for the variable r.

In the following step S72, since nest=1 and nestmax=1 are set now, the judgment result becomes NO. The progress then goes to step S79 and the value of the variable k is initialized to "0". The progress then goes to step S80.

In step S80, since k=0 is set now, the judgment result becomes YES (0<4). The progress thus goes to step S81. In step S81, it is judged whether or not the (X'[p,r−1],k) element of the array tbl is equal to the (p,r)-th element of the array X or the value of the variable r is equal to the W value. Since p=0, r=3, and k=0 are set now, the value of X'[p,r−1] is 2 (value substituted in step S76). Consequently, the value of tbl (X'[p,r−1],k) becomes 2. In addition, since X[p,r]=8 is assumed, the judgment result in step S81 becomes NO. The progress thus goes to step S82.

In other word, when the second index is "2", the 0th value of the third index is "2". Thus, it is judged "not match" (NO) with the non-encoded data "8".

Subsequently, in the processing of k=1, 2, 3, the value of tbl (X'[p,r−1],k) becomes "3", "1", "0" (the first to third value of the third index when the second index in FIG. 10 is "2"). As described above, since X[p,r]=8 is assumed, the judgment result in any processing becomes NO. Consequently, the judgment result in the fourth (k=4) step S80 becomes NO. The progress then goes to step S93 and the value of the variable nest is increased by one to nest=0. The progress then returns to the processing in step S78.

In step S78, the value of the variable k is increased by one to k=2. Then, the progress returns to step S75 and the judgment result becomes YES. The progress then goes to step S76. Then, the same processing as that of the above is executed, so that the (3,2)-th element "1" of the array tbl is substituted for the (0,2)-th element of the array X', as well as "2" is substituted for the (0,2)-th element of the array Z. Then, the subroutine is called in step S77.

In other words, "1" is assumed as the second index value to call the subroutine.

The subsequent processings are the same as those described above. In other words, nest=1 is set in the processing in step S70 and the value of (q+nest) (=3) is substituted for the variable r in the processing in step S71. Then, in step S72, the judgment result becomes NO. The progress thus goes to step S79.

And, in the 0th (k=0) processing, it is judged whether or not the (X'[p,r−1],k)-th element of the array tbl is equal to the (p,r)-th element of the array X or the value of the variable r is equal to the W value. Since p=0, r=3, and k=0 are set now, the value of X'[p,r−1]=1 (value substituted in step S76) is assumed. Consequently, tbl (X'[p,r−1],k)=1 is assumed. And, since X[p,r]=8 is assumed, the judgment result becomes NO.

In the first (k=1) processing, since tbl (X'[p,r−1],k)=8 is assumed, the judgment result in step S81 becomes YES. In other words, since the second index in FIG. 10 is "1" and the second value of the third index is "8", the judgment result becomes YES. The progress thus goes to step S83 and the value of the variable success is increased by one. Then, the progress goes to step S85 to call the subroutine shown in FIG. 13.

In step S100 in FIG. 13, the value of the variable err is initialized to "0". In the following step S101, the value of the variable q (=2) is substituted for the variable r. The progress then goes to step S102.

In step S102, it is judged whether or not the value of the variable r is smaller than the value of (q+nestmax). Since r=2 and (q+nestmax)=3 are set now, the judgment result becomes YES. The progress thus goes to step S103.

In steps S103 to S105, the error of each of the R, G, and B signals caused by the change of the second index (from "5" to "1" in this case) is calculated and the result is substituted for the variable err.

In other words, array X={2, 3, 5, 8} is assumed and the transition of the first element "3" and the second element "5" does not exist in the transition table shown in FIG. 9 (an element "5" is not found in the third column of tbl), matching between the first and second elements is abandoned and "3", "2", "1", and "4" are substituted for the second element of the array X' in step S76 to enable matching between the second and third elements. Then, matching between the second element of the array X and the third element (=8) of the array X is enabled (the path for this matching is searched) in step S81.

The error is then calculated for the matching path found as a result of path searching. In other words, since the second element differs from the original element (=5), substitution of the new second element for the color look-up table shown in FIG. 6 causes an error between the element and each of the R, G, and B signals. The sum of the squared errors of those signals is calculated as the err value. As a result, a path whose error is minimized is selected from the matching-assured paths.

In step S103, the value of {R(X'[p,r])−R(X[p,r])}2 is added to the value of the variable err. In the same way, the value of {G(X'[p,r])−G(X[p,r])}2 is added to the value of the variable err in step S104. In addition, in step S105, {B(X'[p,r])−B(X[p,r])}2 is added to the value of the variable err.

The progress then goes to step S106 and the value of the variable r is increased by one. After this, the progress returns to step S102. In step S102, it is judged whether or not the value of the variable r is smaller than the value of (q+nestmax). Since r=3, q=2, and nestmax=1 are set now, the judgment result becomes NO. The progress thus returns to the processing in step S85.

In step S85, it is judged whether or not the value of the variable err is smaller than the value of the variable errmin or the value of the success is "1". Since success=1 is set in step S83, the judgment result becomes YES. The progress thus goes to step S86 and the value of the variable err is substituted for the variable errmin. The error caused by the change of the second element of the array X' from "5" to "1" is thus substituted for the variable errmin.

In the following step S87, the value of the variable k (=1) is substituted for the (0,3)-th element of the array Z, and furthermore, the (0,2)-th element "8" of the array X is substituted for the (0,2)-th element of the array X' in step S88. Then, the progress goes to step S89 and the value of the variable q is substituted for the variable j. Since q=2 is set now, j=2 is assumed. The progress thus goes to step S90.

In step S90, it is judged whether or not the value of the variable j is smaller than the value of the variable r. Since r=3 is set now, the judgment result becomes YES. The progress thus goes to step S91. In step S91, the (p,j)-th element of the array Z is substituted for the (p,j)-th element of the array Z'. In other words, Z[0,2]=2 is substituted for the (0,2)-th element of the array Z'.

The progress then goes to step S92 and the value of the variable j is increased by one to j=3. The progress then returns to step S90. In step S90, the judgment result becomes YES (3≦3). The progress thus goes to step S91.

In step S91, Z[0,3]=1 is substituted for the (0,3)-th element of the array Z', then the progress goes to step S92 and the value of the variable j is increased by one. Then, the progress returns to step S90. The judgment result in step S90 becomes NO, and the progress goes to step S93.

In step S93, the value of the variable nest is increased by one to nest=0. The progress then returns to the processing in step S78.

In step S78, the value of the variable k is increased by one to k=3. The progress then returns to step S75. In step S75, the judgment result becomes YES (3≦4) and the progress goes to step S76.

In step S76, the (X'[p,r−1],k)-th element of the array tbl is substituted for the (p,r)-th element of the array X'. In other words, since p=0, r=3, k=3, and r=2 are set now, tbl(X'[p,r−1],k)=4 is assumed. This value "4", is substituted for the (0,2)-th element of the array X'. In addition, "3" is substituted for the (0,2)-th element of the array Z. Then, the progress goes to step S77 to call the subroutine (to execute the processing in step S70).

In other words, a processing corresponding to the second index value="4" in FIG. 10 is executed.

The processings in and after step S70 are the same as those described above. Since the (4,1)-th element (in the second row on the fifth column in FIG. 9) of the array tbl is "8", the judgment result in step S81 for the first (k=1) loop becomes YES. The progress thus goes to step S83.

In other words, since the first value of the third index is "8" when the second index is "4" in FIG. 10, the judgment result becomes YES.

In step S83, the value of the variable success is increased by one. The progress then goes to step S84.

In step S84, the subroutine shown in FIG. 13 is called. And, in the same way as described above, the error generated by the change of the second index from "5" to "4" is calculated and the result is substituted for the variable err. The progress then returns to step S85.

In step S85, it is judged whether or not the value of the variable err is smaller than the value of the variable errmin or the value of the variable success is "1". Now, it is assumed that err>errmin is satisfied. In other words, when the error of the path for the second index="1" is smaller than the error of the path for the second index="4" in FIG. 10, success=2 is assumed. Thus, the judgment result becomes NO in step S85. The progress then goes to step S93 and the value of the variable nest is decreased by one. The progress then returns to the processing in step S78.

In step S78, the value of the variable k is increased by one to k=4. The progress then returns to step S75. In step S75, the judgment result becomes NO. The progress thus goes to step S93 and the value of the variable nest is decreased by one. The progress then returns to step S48 in FIG. 11.

In step S48, the value of the variable nestmax is increased by one and the progress goes to step S49. In step S49, since success=2 is set now, the judgment result becomes YES. The progress then goes to step S50. And, the value of nestmax is added to the variable q, so that q=4 is assumed. The progress then returns to the processing in step S44.

Since the number of pixels W in the horizontal direction on the screen is 4 and the number of pixels H in the vertical direction is 1, the judgment result in step S44 becomes NO. The progress thus goes to the processing in step S51.

In step S51, the value of the variable p is increased by one and the progress returns to step S41. Since p=1 and H=1 are set now, the judgment result in step S41 becomes NO. The processing is thus ended (END).

According to the above processings, when X={2,3,5,8} is entered as the index (4 bits) of a non-ended pixel, the index (4 bits) of the encoded index becomes X'={2,3,1,8}. In addition, encoded data Z' (2 bits) becomes Z'={1,2,1}.

Consequently, according to the above embodiment, reference to a reference table listing up entered pixel data in order to the adjacent pixel transition appearance frequency enables compression of data effectively.

Figure 14:
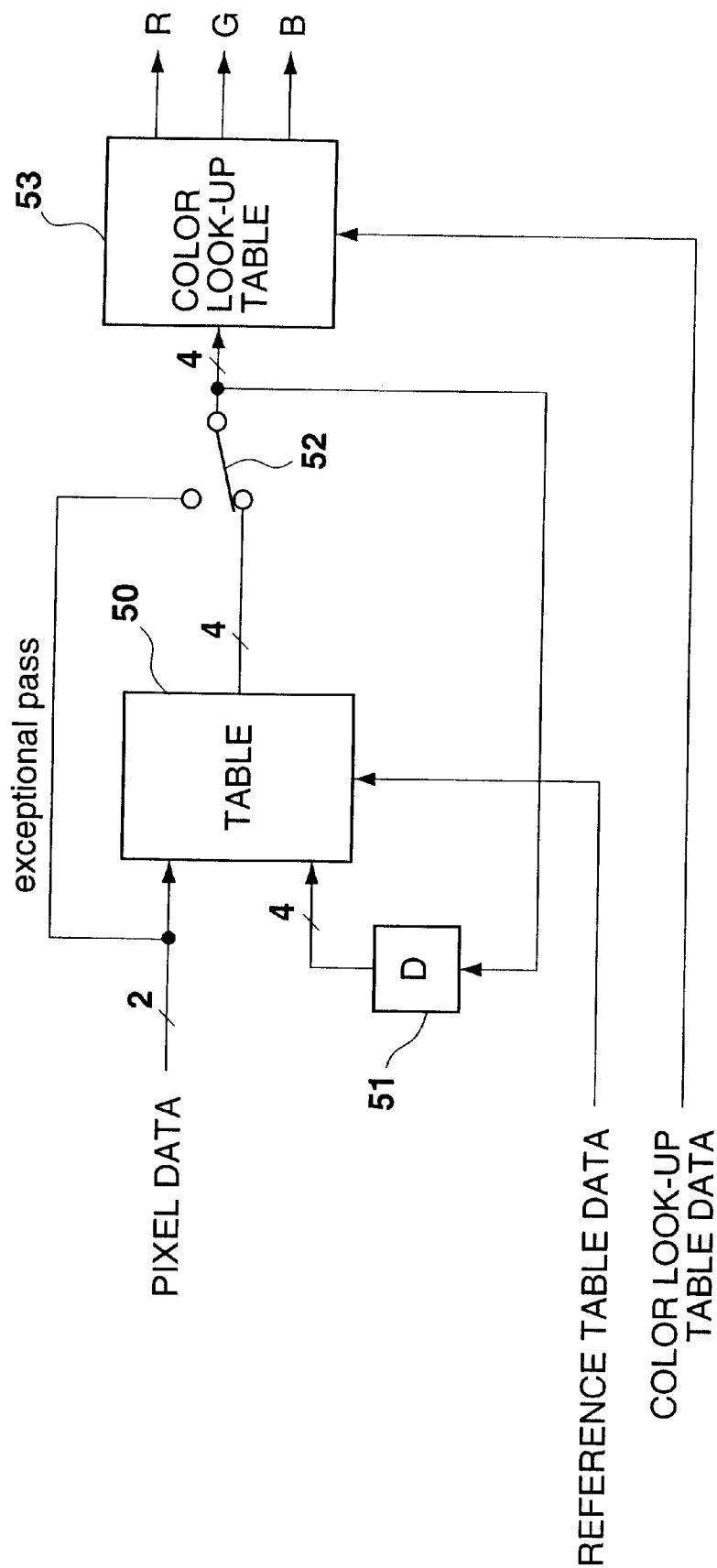
FIG. 14 is a block diagram showing a detailed configuration of the GPU 5 shown in FIG. 1.

FIG. 14 is an example of a detailed configuration of the GPU 5 shown in FIG. 1.

In FIG. 14, the table 50 (reference table means, input means, and decoding means) contains a reference table (FIG. 9) corresponding to the pixel data to be entered. When encoded 2-bit data (hereafter, to be abbreviated as encoded data) is entered, the corresponding 4-bit pixel data (original data) is output. The delay circuit (D) 51 (encoder) delays 4-bit data output from the table 50 by one data and supplies the result to the table 50. The switch 52, when the pixel data entered to the GPU 5 is the 0th (first) data (4 bits), is changed over to the exceptional pass side, so that the data is supplied to the color look-up table 53 (color look-up table memory and converter). When other data (2 bits) is entered, the switch 52 is connected to the table 50, so that decoded data output from the table 50 is output to the color look-up table 53.

The color look-up table shown in FIG. 6 is stored in the color look-up table 53, which receives decoded data supplied via the switch 52 and outputs R, G, and B image signals corresponding to the data.

Encoding of images is executed for a specific area on the screen (e.g., an area comprising patterns of similar images) defined as a processing unit. Thus, each of the reference and the color look-up tables is created for each processing unit. Consequently, data in those two tables is read just before data of a new processing unit is entered and stored in both table 50 and color look-up table 53.

Subsequently, the operation of the above embodiment will be explained.

The CPU 1 shown in FIG. 1 transmits the progress signals to the CD-ROM drive 4 and reads data from both the reference table and the color look-up table, which is recorded on a CD-ROM and supplies the data to the GPU 5. Receiving the data, the GPU 5 stores the reference table data to the table 50 and the color look-up table data to the color look-up table 53 respectively.

When storing of the data in those tables is ended, the CPU 1 transmits the progress signals to the CD-ROM drive 4, so that the CD-ROM drive 4 reads pixel data (2 bits) and supplies the data to the GPU 5.

Receiving the 0th (first) pixel data (4 bits), the switch 52 of the GPU 5 is changed over to the exceptional pass side, so entered data is supplied to the color look-up table 53 and the delay circuit 51 respectively.

The entered first encoded data (2 bits) is supplied to the table 50. At this time, the 0th data is output from the delay circuit 51, so that the table 50 decodes the entered first data and the data output from the delay circuit 51 to original pixel data (4 bits) and outputs the decoded data.

Since the switch 52 is connected to the table 50 now, the data output from the table 50 is output to the delay circuit 51 and the color look-up table 53. The color lookup table 53 outputs R, G, B signals in size corresponding to the entered data.

The same processing is repeated for the second and subsequent encoded data to output decoded R, G, and B signals sequentially. Such a processing is repeated until a processing unit is ended. For decoding the next processing unit, new data of the reference table and the color look-up table is read from the CD-ROM drive 4 and stored in the color look-up table 53 and the table 50 respectively. Then, the data is decoded.

According to the above embodiment, in which pixel data transition information and adjacent decoded pixel information are used, image information can be compressed effectively, as well as the number of color types that can be represented can be increased.

Figure 15:
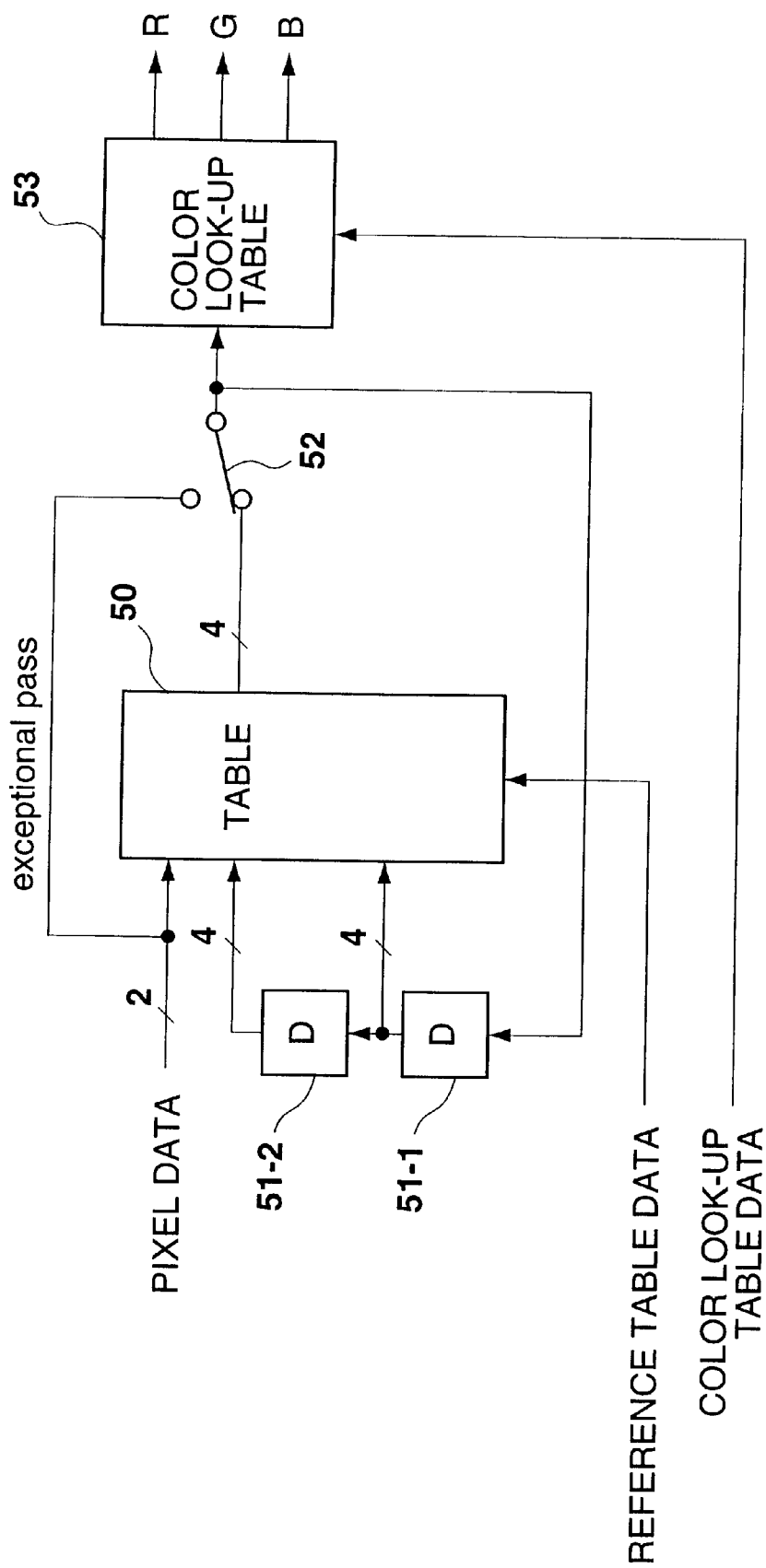
FIG. 15 is a block diagram showing another detailed configuration of the GPU 5 shown in FIG. 1.

FIG. 15 is a block diagram showing a configuration of another embodiment of the present invention.

In FIG. 15, the same items as those in FIG. 14 are given the same numerals, omitting redundant explanation. In FIG. 15, two delay circuits 51-1 and 51-2 are provided. The output from each of the delay circuits 51-1 and 51-2 is entered to the table 50. The switch 52 is connected to the exceptional pass side when the 0th and first encoded data are entered.

The reference table stored in the table 50 decodes the data of pixel one pixel before and the data of pixel two pixels before (vertical direction) and encoded data (horizontal direction) to original data. For example, if, when the data of pixel two pixels before and the data of pixel one pixel before are "0" and "1" (first column), encoded data is "3" (third row), then the decoded data becomes "6".

Other items are the same as those in FIG. 14.

Subsequently, the operation of this embodiment will be explained briefly.

The 0th coded data (4 bits), when entered, is supplied to the table 50. Since the switch 52 is connected to the exceptional pass side at this time, the 0th pixel data is supplied to both the color look-up table 53 and the delay circuit 51-1. The color look-up table 53 generates R, G, and B signals corresponding to the entered pixel data with reference to the color look-up table shown in FIG. 6 and output the signals.

The switch 52 is also connected to the exceptional pass side even when the first encoded data (4 bits) is entered. Consequently, the first pixel data is supplied to both the color look-up table 53 and the delay circuit 51-1. The color look-up table 53 generates R, G, and B signals corresponding to the entered pixel data and output the signals.

The switch 52 is changed over to the table 50 side when the second encoded data (2 bits) is entered. Table 50 decodes the second encoded data, as well as the data output from the delay circuit 51-1 (data of pixel one pixel before) and the data output from the delay circuit 51-2 (data of pixel two pixels before) to original data respectively by applying those data to the reference table. Decoded data is supplied to the color look-up table 53 and the delay circuit 51-1 via the switch 52.

The color look-up table 53 outputs R, G, and B signals corresponding to the pixel data decoded by the table 50.

This operation is repeated until a processing unit is ended, reproducing image data. Ending of a processing unit allows another processing unit of data in the color look-up table and the reference table to be read from the CD-ROM drive 4. The read data is stored in both the color look-up table 53 and the table 50 respectively, allowing another encoded data to be read.

According to the above embodiment, which uses pixel data transition information and decoded two adjacent pixels information, the number of color types that can be represented can be increased, as well as each pixel data generation probability can be lowered. Consequently, entropy can further be lowered. For example, in an example shown in FIG. 7, 1.32 entropy can be lowered up to 1.18. As a result, the error to be generated in encoding can be reduced more significantly.

Figure 17:
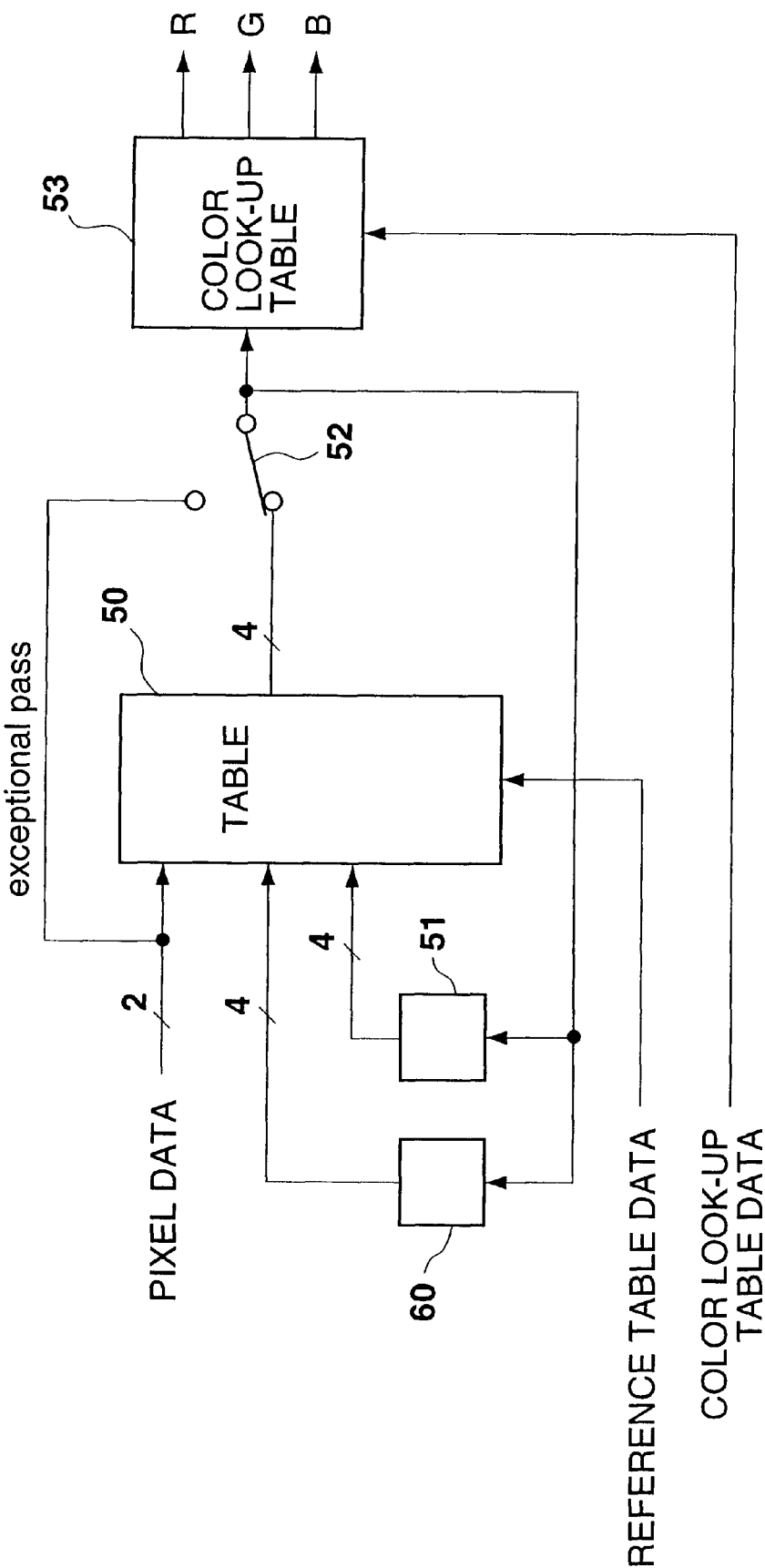
FIG. 17 is a block diagram showing a further detailed configuration of the GPU 5 shown in FIG. 1.

FIG. 17 is a block diagram showing a configuration of another embodiment of The present invention.

In FIG. 17, the same numerals are given to the same items as those in FIG. 14, avoiding redundant explanation. In this embodiment, a delay circuit (H) 60 (decoder) is newly provided. The delay circuit is used to delay a processing by the number of horizontal pixel data items on the screen. In addition, the switch 52 is connected to the exceptional pass side until entry of encoded data from the 0th to a horizontal pixel (the 0th horizontal pixel data) is ended.

In the reference table stored in the table 50, the data of pixel two pixels before in the reference table shown in FIG. 16 is replaced with the data of pixel one pixel before.

Other items are the same as those in FIG. 14.

In this embodiment, as described above, the switch 52 is connected to the exceptional pass side while the 0th (first) pixel encoded data (4 bits) is entered. Consequently, entered encoded data is supplied to the delay circuit 60 via the switch 52, as well as it is supplied to the color look-up table 53. The color look-up table 53 outputs R, G, and B signals corresponding to entered encoded data.

At this time, the table 50 does not execute any decoding processing, so entered pixel data and the data output from the delay circuit 51 are ignored.

Subsequently, when entry of the first horizontal pixel data is started, the connection of the switch 52 is changed over to the table 50 side. The table 50 then applies inputted encoded data, the data of one pixel before output from the delay circuit 51, and the data of one horizontal pixel before to original data with reference to the reference table. Decoded data is supplied to the color look-up table 53 via the switch 52.

The color look-up table 53 generates and outputs R, G, and B signals corresponding to decoded data with reference to the color look-up table.

The above processing is repeated for a processing unit. Ending of the processing for a processing unit allows another processing unit of data in the color look-up table and the reference table to be read from the CD-ROM drive 4. The read data is then stored in both the color look-up table 53 and the table 50 respectively, allowing a decoding processing is to be executed for another processing unit of encoded data.

According to the above embodiment, in which pixel data is compressed (encoded) and decoded according to the index transition information from not only the data of pixel one pixel before, but also the data of pixel one horizontal line before, generation of the error in encoding can be suppressed more significantly than the embodiment shown in FIG. 14.

Furthermore, when creating a reference table shown in FIG. 9 in the above embodiment, four ways of pixels with higher appearance probability is enabled. However, The present invention is not limited to such a case. For example, in addition to the appearance probability, the difference of the color change from the adjacent pixel (distance between R, G, and B spaces) is considered to create a reference table.

For example, in the case that the color of a pixel differs extremely from that of an adjacent pixel even when the appearance probability is low, the frequency of error occurrence is expected to be increased. To avoid this, four ways of pixel selection is employed. The first selection is a pixel with the highest probability of appearance. The other three selections may be made according to the result of weighing for probability of appearance and color difference of pixels. According to such a method of pixel selection, error occurrence in data compression (encoding) can be suppressed significantly even when the difference of color change from adjacent pixels is extremely large.

When a single image contains a plurality of different characteristics (display pattern, etc.), the image may be divided into a plurality regions, each of which corresponds to one characteristic, so that each region is assumed as a processing unit and a reference table created for each region is used to decode the data in each processing unit (region). Such a configuration will be able to reduce encoding errors, although the number of reference tables to transmit or record is increased.

Furthermore, although information encoded with reference to a reference table is output as is in the embodiment, information may also be encoded again using, for example, a variable length coding method (run length coding or Huffman coding method) before it is output, of course. Such a configuration will be able to compress image information more effectively.

In the case of a home TV game playing apparatus, there is a method used sometimes for regarding a region provided with a specific index (hereafter, to be referred to as a specific index) as a transparent region and avoiding drawing in such the region while drawing characters with a sprite.

Figures 18, 19:
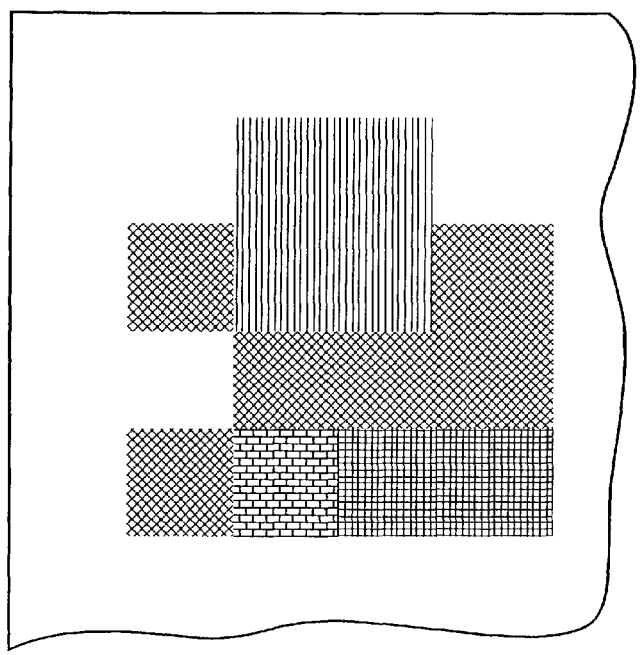
FIG. 18 shows an example of index data corresponding to an image including a transparent region.
FIG. 19 is a display example of the index data shown in FIG. 18.

For example, when a specific index is 0, the index data shown in FIG. 18 is drawn as a display screen as shown in FIG. 19. If, when an image compression processing is executed for Such the image data as described above, this specific index is changed to other data, then that portion is displayed in a specific color, so that image information is changed significantly. On the other hand, when a specific index is changed to another index, the border information will be omitted.

Figure 20:
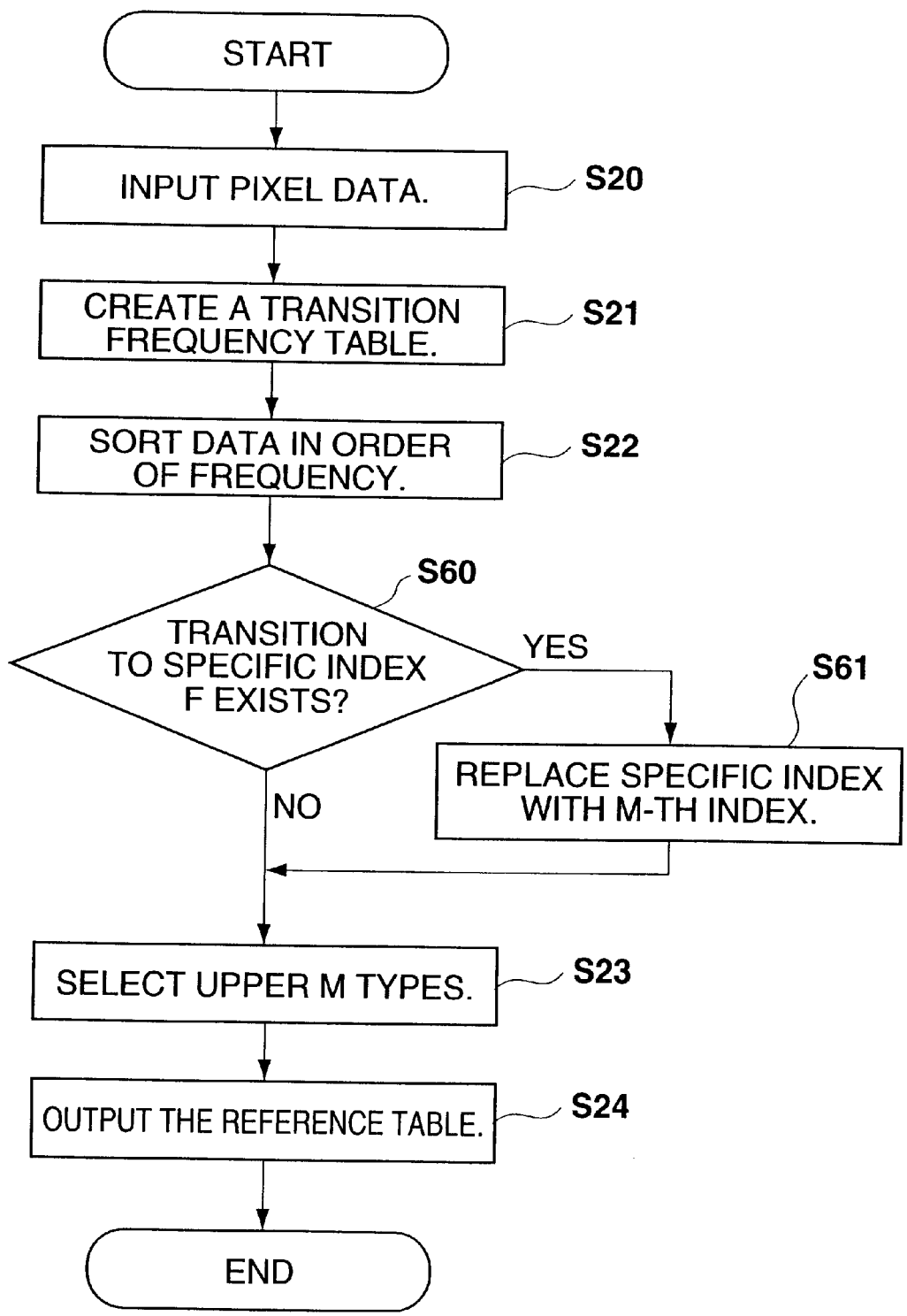
FIG. 20 is a flow chart modified so as to make the processing in FIG. 5 correspond to a transparent region.

FIG. 20 is an example of creating a reference table corresponding to the data containing a specific index as described above. In FIG. 20, the same numerals are given to the same items as those in FIG. 5, avoiding redundant explanation.

In the processing shown in FIG. 20 are added newly steps S60 and S61, which are not provided in the processing in FIG. 5. In step S60, it is judged whether or not a transition to a specific index (=0) exists. When judged YES (exist), the progress goes to step S61. When judged NO (not exist), the progress goes to step S23.

In step S61, the M-th index of transition frequency is replaced with a specific index. The progress then goes to step S23.

In step S23, indexes within the upper M types of transition frequency are selected. In other words, when there is data for transition to a specific index F, this specific index F is replaced with the M-th index in step S61. Thus, each of the upper M types of indexes selected in step S23 always contains a specific index. Consequently, specific indexes are always stored.

Figure 21:
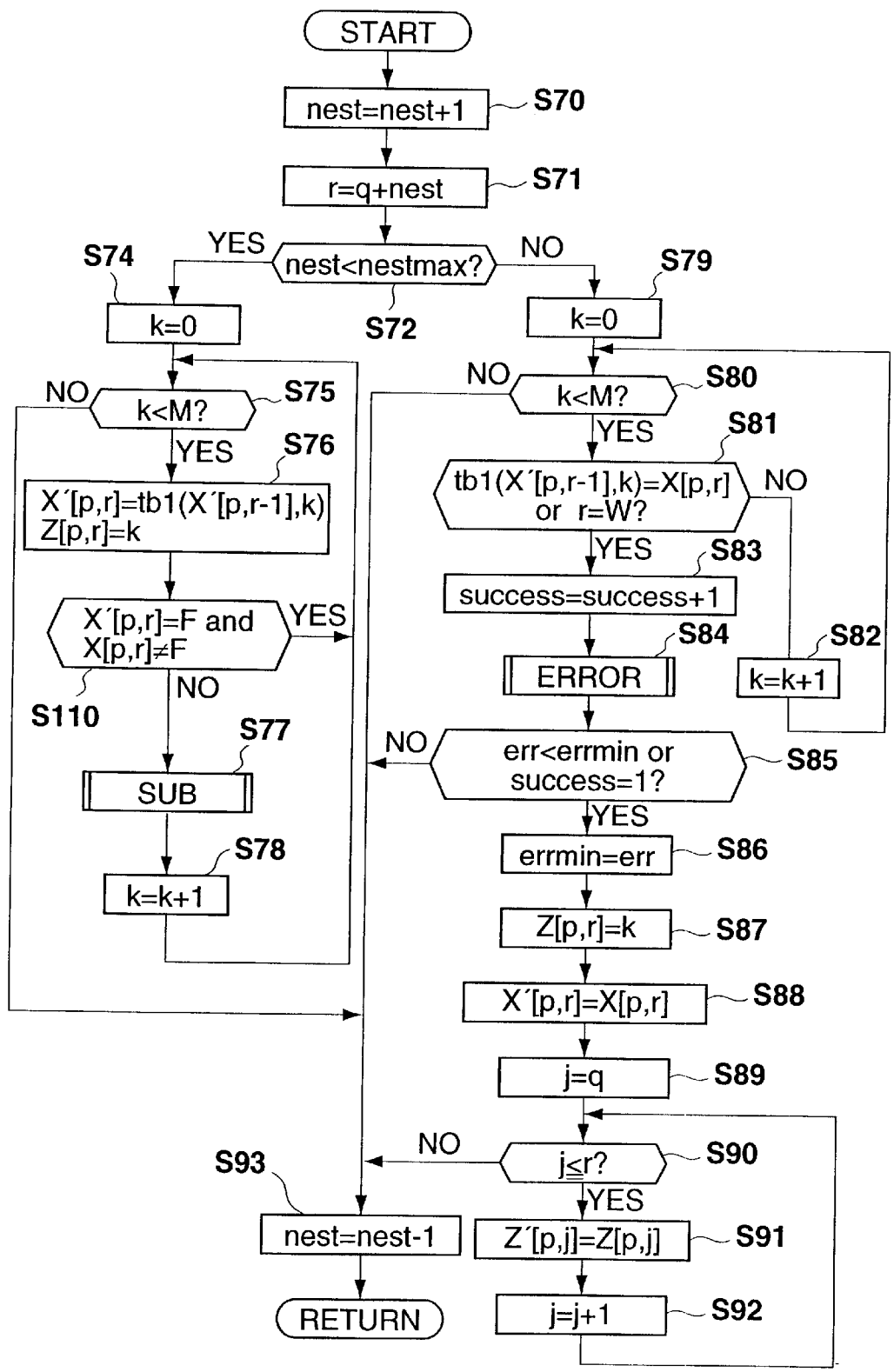
FIG. 21 is a flow chart modified so as to make the processing in FIG. 12 correspond to a transparent region.

FIG. 21 is a flow chart explaining a processing for modifying the subroutine used in step S47 in FIG. 11 so as to correspond to specific indexes. In this flow chart, the same numerals are given to the same items as those in FIG. 12, avoiding redundant explanation.

Step S110 is newly added in this processing. In step S110, it is judged whether or not ordinary pixel data (X[p,r]≠F) is converted to a specific index (X'[p,r]=F). When judged YES (converted), the progress returns to step S75 to repeat the same processing as that explained in FIG. 12. When judged NO (not converted), the progress goes to step S77, continuing data conversion.

According to the above processings, therefore, when non-specific index data is converted to a specific index, the judgment result in step S110 becomes YES and the processing for the conversion is ignored. Thus, conversion from ordinary data to a specific index can be prevented.

Although a specific index is replaced with the M-th data when there is data for transition to a specific index, The present invention may not be limited only to such a case. For example, a specific index may also be replaced with the (M−1)-th data, of course.

According to an encoder and an encoding method provided by the present invention, transition information concerning transition of indexes of at least two of adjacent pixels of pixels forming an image is computed and part of the computed transition information is selected by a specified method to create a reference table, and the created reference table is referenced to encode images. This provides high quality images which can be transmitted, recorded, or displayed with less amount of information.

According to a recording medium provided by the present invention, transition information concerning transition of indexes of at least two of adjacent pixels of pixels forming an image is computed and part of the computed transition information is selected by a specified method to create a reference table, and the created reference table and image information encoded with reference to the reference table are made to be recorded on the recording medium. Therefore, much more images can be recorded on the recording medium.

According to a decoder and a decoding method provided by the present invention, transition information concerning transition of indexes of at least two or more adjacent pixels of pixels forming an image is computed and part of the computed transition information is selected by a specified method to create a reference table which is stored, image data encoded with reference to the reference table is inputted, and the inputted image data is decoded with reference to the stored reference table. Hence, a decoder can be formed with a simple configuration, so that processing of decoding can be speeded up significantly. In addition, a real time processing, for example, in a television set, is enabled.

What is claimed is:

1. An encoder comprising
   means for computing transition information for each of a number of respective pixels, said transition information representing a transition between indexes of a respective pixel and at least one adjacent pixel, in which each index represents a color of the respective pixel;
   means for arranging for each said index of the number of respective pixels, a respective number of indexes arranged in order of the frequency of transition between a respective color represented by said index and a respective color represented by each one of said respective number of indexes and for selecting only part of the arranged indexes by a specified method to create a reference table therefrom such that the reference table includes a number of indexes for each said index in which each said index represents the color of the respective pixel and in which the number of indexes represents the color or colors of a number of adjacent pixels; and
   means for encoding each pixel of an image corresponding to one of said indexes in accordance with a transition from said one of said indexes to one of said respective number of indexes for said pixel in accordance with said reference table.

2. An encoder as defined in claim 1, wherein said indexes are defined by a color look-up table.

3. An encoder as defined in claim 1, wherein said means for creating a reference table creates said reference table by selecting said transition information items by a specified number in order of an appearance frequency.

4. An encoder as defined in claim 1, wherein said means for creating a reference table creates said reference table, when said transition information includes a specific index, by selecting the index as a preferential one.

5. An encoder as defined in claim 1, wherein said means for creating a reference table creates said reference table by selecting a specified number of said transition information items according to differences in appearance frequencies of said transition items and display colors of said adjacent pixels.

6. An encoder as defined in claim 1, wherein said means for encoding, when said reference table does not include transition information corresponding to a first pixel to be encoded, changes the indexes of the pixels between said first pixel and a pixel just before a second pixel positioning behind said first pixel so that a correspondence to said reference table is obtained in said second pixel.

7. An encoder as defined in claim 6, wherein, when a plurality of ways of selection exist in obtaining the correspondence in said second pixel as a result of said index change, a way is selected in which errors in display colors of pixels before and after changing the indexes are minimized.

8. An encoder as defined in claim 6, wherein, a plurality of ways of selection exist in obtaining the correspondence in said second pixel as a result of said index change, a way is selected in which errors in display colors of pixels before and after changing indexes are minimized and no pixel exists whose index is changed to a specific index.

9. An encoder as defined in claim 1 further comprising means for variable length encoding information encoded by said encoding means.

10. An encoder as defined in claim 1, wherein said means for computing transition information, when said image includes a plurality of portions with different characteristics, divides said image into a plurality of regions according to said characteristics and computes said transition information for each of said regions.

11. A method of encoding an image comprising the steps of:

computing transition information for each of a number of respective pixels, said transition information representing a transition between indexes of a respective pixel and at least one adjacent pixel, in which each index represents a color of the respective pixel;

arranging for each said index of the number of respective pixels, a respective number of indexes arranged in order of the frequency of transition between a respective color represented by said index and a respective color represented by each one of said respective number of indexes and selecting only part of the arranged indexes by a specified method to create a reference table therefrom such that the reference table includes a number of indexes for each said index in which each said index represents the color of the respective pixel and in which the number of indexes represents the color or colors of a number of adjacent pixels; and encoding each pixel of an image corresponding to one of said indexes in accordance with a transition from said one of said indexes to one of said respective number of indexes for said pixel in accordance with said reference table.

12. A recording medium having recorded thereon a reference table and image data, said reference table being created by computing transition frequency information of indexes of at least two adjacent pixels of those forming an image in which each index represents a color of the respective pixel, arranging for each said index of a number of respective pixels a respective number of indexes arranged in order of the frequency of transition between a respective color represented by said index and a respective color represented by each one of said respective number of indexes, and selecting only part of the arranged indexes by a specified method such that the reference table includes a number of indexes for each said index in which each said index represents the color of the respective pixel and in which the number of indexes represents the color or colors of a number of adjacent pixels, and said image data being encoded in accordance with said reference table.

13. A recording medium as defined in claim 12, wherein said recording medium has recorded thereon a color look-up table defining a correspondence between an index and a display color of the respective pixel.

14. A decoder comprising:

means for receiving a reference table, said reference table being created by computing transition frequency information of indexes of at least two adjacent pixels of those forming an image in which each index represents a color of the respective pixel, arranging for each said index of a number of respective pixels, a respective number of indexes arranged in order of the frequency of transition between a respective color represented by said index and a respective color represented by each one of said respective number of indexes, and selecting only part of the arranged indexes by a specified method such that the reference table includes a number of indexes for each said index in which each said index represents the color of the respective pixel and in which the number of indexes represents the color or colors of a number of adjacent pixels;

means for receiving image data encoded in accordance with said reference table; and means for decoding the received image data in accordance with the received reference table.

15. A decoder as defined in claim 14 further comprising:

means for receiving a color look-up table; and means for converting image data, said means converting said image data being decoded by said means for decoding into an original signal with reference to the received color look-up table.

16. A method of decoding image data comprising the steps of:

receiving a reference table, said reference table being created by computing transition frequency information of indexes of at least two adjacent pixels of those forming an image in which each index represents a color of the respective pixel, arranging for each said index of a number of respective pixels, a respective number of indexes arranged in order of the frequency of transition between a respective color represented by said index and a respective color represented by each one of said respective number of indexes, and selecting only part of the arranged indexes by a specified method such that the reference table includes a number of indexes for each said index in which each said index represents the color of the respective pixel and in which the number of indexes represents the color or colors of a number of adjacent pixels;

receiving image data encoded in accordance with said reference table; and decoding the received image data in accordance with the received reference table.

* * * * *